(12) United States Patent
Fujita et al.

(10) Patent No.: US 6,491,373 B1
(45) Date of Patent: Dec. 10, 2002

(54) PRINTING METHOD AND A PRINTING APPARATUS

(75) Inventors: Miyuki Fujita, Tokyo; Yuji Konno; Tetsuhiro Maeda, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 09/640,380

(22) Filed: Aug. 17, 2000

(30) Foreign Application Priority Data

Aug. 24, 1999 (JP) .......................................... 11-237299

(51) Int. Cl.$^7$ ................................................. B41J 2/15
(52) U.S. Cl. .............................. 347/41; 347/15; 347/43; 358/1.2
(58) Field of Search ................................ 347/9, 12, 40, 347/41, 15, 43; 358/1.2, 1.8, 1.9, 502, 521, 534, 298

(56) References Cited

U.S. PATENT DOCUMENTS

| | | | | |
|---|---|---|---|---|
| 4,272,771 A | * | 6/1981 | Furukawa | 347/40 |
| 4,920,355 A | | 4/1990 | Katerberg | 347/41 |
| 5,914,731 A | * | 6/1999 | Yano et al. | 347/9 |
| 6,003,970 A | | 12/1999 | Fujita et al. | 347/41 |
| 6,020,976 A | | 2/2000 | Fujita et al. | 358/1.3 |
| 6,025,928 A | | 2/2000 | Takemura et al. | 358/1.3 |
| 6,203,133 B1 | * | 3/2001 | Tanaka et al. | 347/15 |
| 6,213,585 B1 | * | 4/2001 | Kikuchi et al. | 347/41 |
| 6,283,571 B1 | * | 9/2001 | Zhou et al. | 347/15 |

FOREIGN PATENT DOCUMENTS

| | | | |
|---|---|---|---|
| JP | 7242025 | 9/1995 | B41J/2/51 |
| JP | 9046522 | 2/1997 | H04N/1/40 |

* cited by examiner

Primary Examiner—Lamson D. Nguyen
(74) Attorney, Agent, or Firm—Fitzpatrick, Cella, Harper & Scinto

(57) ABSTRACT

Deterioration in image quality is caused by deviation in dot forming positions between rasters in the case of carrying out printing of adjoining two rasters. The rasters are printed by two columns of ejection openings array disposed on an ink-jet head. To suppress image quailty deterioration, the two columns of ejection openings are shifted from each other by a half of a pitch at which the ejection openings are arranged in the column. When allocating input image data quantized into multi-valued levels to 2×2 dot array as pseudo half-tone processing before printing, the mutually different plural dot arrangements are applied concerning each level of the input image data, and the plural dot arrangements are cyclically changed in the main scanning direction according to predetermined rules, and also equalization processing for equalizing the number of said adjoining the two raster dots is properly performed in the one cycle. Thus, differences in a covering ratio of the printing medium with formed dots can be put to 10% or less in a range where the adjoining two rasters are deviated from each other by at least ±2 pixels in the scanning direction.

28 Claims, 27 Drawing Sheets

WITHOUT DEVIATION

1-PIXEL DEVIATION

2-PIXEL DEVIATION

3-PIXEL DEVIATION

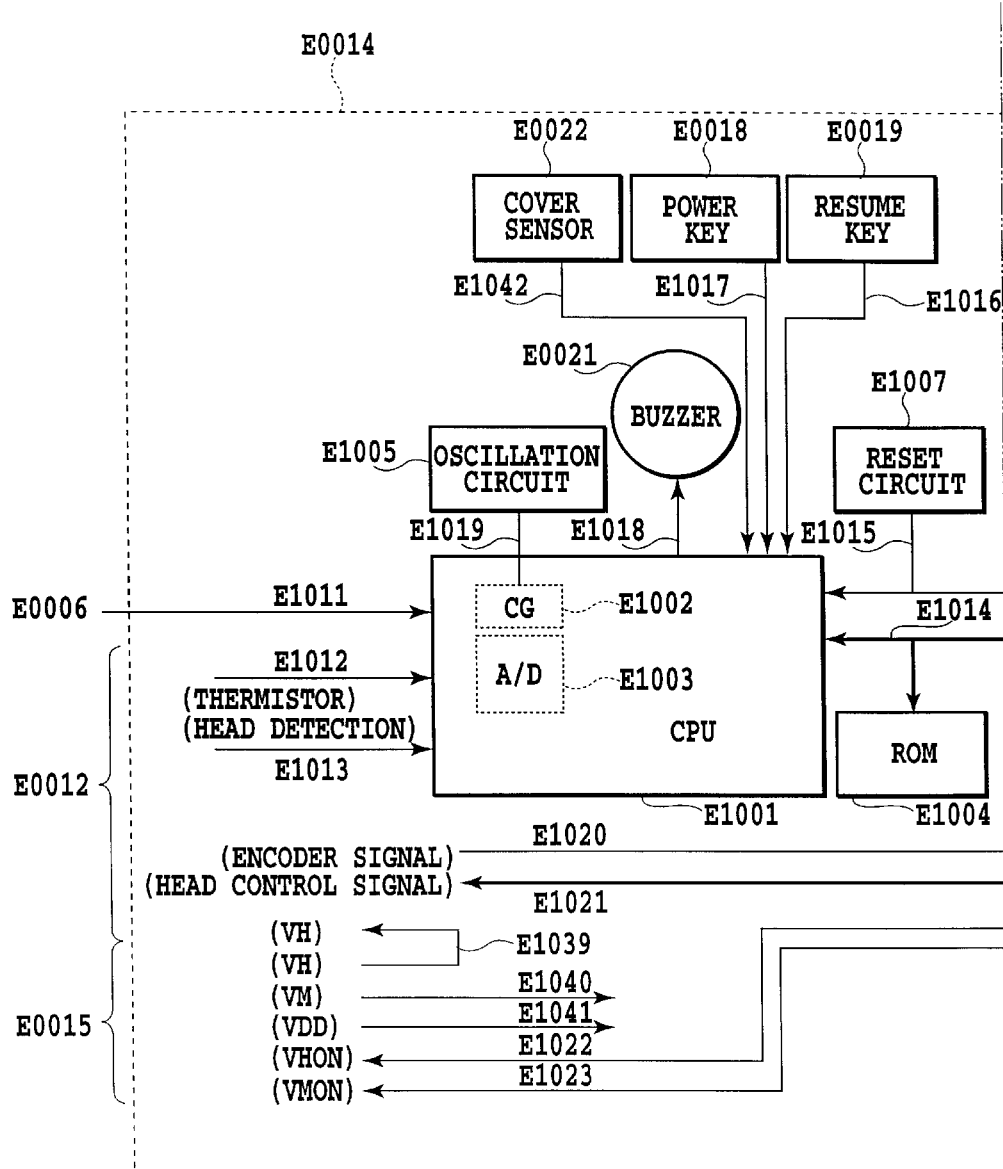

WITHOUT DEVIATION

1-PIXEL DEVIATION

2-PIXEL DEVIATION

3-PIXEL DEVIATION

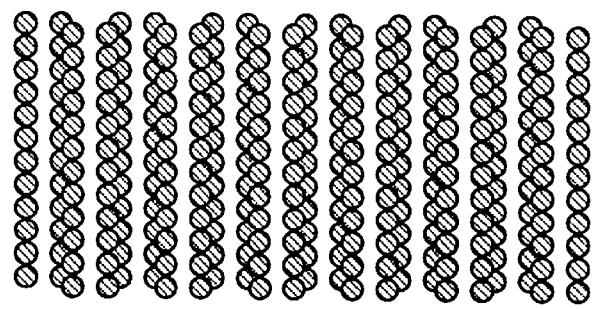

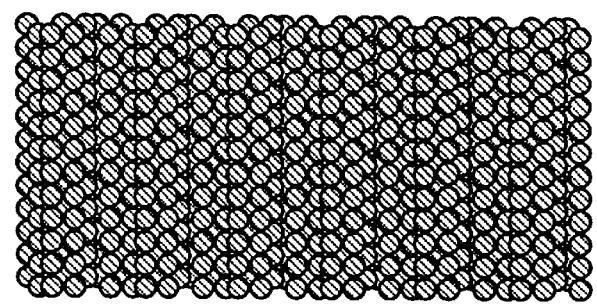

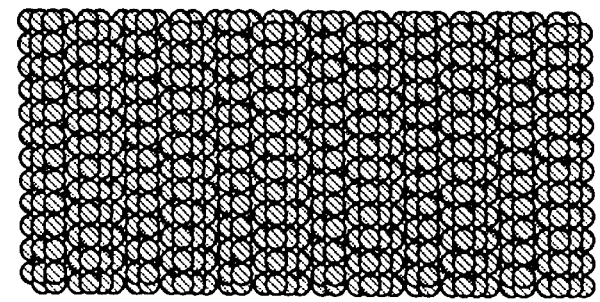

WITHOUT DEVIATION

1-PIXEL DEVIATION

2-PIXEL DEVIATION

3-PIXEL DEVIATION

4-PIXEL DEVIATION

5-PIXEL DEVIATION

6-PIXEL DEVIATION

7-PIXEL DEVIATION

FIG.24

PRINTING METHOD AND A PRINTING APPARATUS

This application is based on Japanese Patent Application No. 11-237299 (1999) filed Aug. 24, 1999, the content of which is incorporated hereinto by reference.

BACKGROUND OF THE INVENTION

1. Field of the Invention

The present invention relates to a printing method and a printing apparatus, and is particularly suited for adjusting the positions of ink dots in a printing apparatus of an ink jet system. In addition to general printing apparatus, the present invention can also be applied to copying machines, facsimiles with a communication system, word processors with a printer, and industrial printing apparatus combined with a variety of processing devices.

2. Description of the Related Art

An image printing apparatus of so-called serial scan type, which executes the print operation while scanning a print head, or a printing unit, over a print medium, has found a variety of image forming applications. The ink jet printing apparatus in particular has in recent years achieved high resolution and color printing, making a significant image quality improvement, which has resulted in a rapid spread of its use. Such an apparatus employs a so-called multi-nozzle head that has an array of densely arranged nozzles for ejecting ink droplets. Images with still higher resolution has now been made possible by increasing the nozzle density and reducing the amount of ink per dot. Further, to realize an image quality approaching that of silver salt picture, various technologies have been developed, including the use of pale or light color ink with reduced density in addition to four basic color inks (cyan, magenta, yellow and black). A print speed reduction problem, which is feared to arise as the picture quality advances, is dealt with by increasing the number of print elements, improving the drive frequency and employing a bi-directional printing technique, thus realizing a satisfactory throughput.

FIG. 19 schematically shows a general construction of a printer that uses the multi-nozzle for printing. In the figure, reference number 1901 represents head cartridges corresponding to four inks, black (K), cyan (C), magenta (M) and yellow (Y). Each head cartridge 1901 consists of an ink tank 1902T filled with a corresponding color ink and a head unit 1902H having an array of many nozzles for ejecting the ink supplied from the ink tank onto a print medium 1907.

Designated 1903 is a paper feed roller which, in cooperation with an auxiliary roller 1904, clamps a print medium (print paper) 1907 and rotates in the direction of arrow in the figure to feed the print paper 1907 in the direction as required. Denoted 1905 is a pair of paper supply rollers that clamp the print paper 1907 and carries it toward the print position. The paper supply rollers 1905 also keep the print paper 1907 flat and tight between the supply rollers and the feed rollers 1903, 1904.

Designated 1906 is a carriage that supports the four head cartridges 1901 and moves them in a main scan direction during the print operation. When the printing is not performed or during an ink ejection performance recovery operation for the head unit 1902H, the carriage 1906 is set at a home position h indicated by a dotted line.

The carriage 1906, which was set at the home position h before the print operation, starts moving in the X direction upon reception of a print start command and at the same time the head unit 1902H ejects ink from a plurality of nozzles (n nozzles) formed therein according to print data to perform printing over a band of a width corresponding to the length of the nozzle array. When the printing is done up to the X-direction end of the print paper 1907, the carriage 1906 returns to the home position h in the case of one-way printing and resumes printing in the X direction. In the case of bi-directional printing, the carriage 1906 also performs printing while it is moving in a −X direction toward the home position h. In either case, after one print operation (one scan) in one direction has been finished before the next print operation is started, the paper feed roller 1903 is rotated a predetermined amount in the direction of arrow in the figure to feed the print paper 1907 in the Y direction a predetermined distance (corresponding to the length of the nozzle array). By repeating the one-scan print operation and the print paper feeding by a predetermined distance, data for one sheet of paper is printed.

In the above serial type ink jet printer, various provisions have been made as to the construction of the head unit or the printing method in order to realize an image printing with higher resolution.

For example, the manufacture of the multi-nozzle head inevitably places a limit on the density of the nozzles in a single nozzle array.

FIG. 20A shows an example head that realizes a higher nozzle density. This head has two columns of nozzles extending in the Y direction and spaced a distance px (corresponding to a predetermined number of pixels) apart in the X direction. The two nozzle columns, each consisting of many nozzles arranged at a predetermined pitch py in the Y direction, are shifted from each other by a distance py/2 in the Y direction. This arrangement of the nozzles realizes a resolution two times higher than that achieved by a single nozzle column. When this head is applied to the apparatus shown in FIG. 19, the heads having the construction shown in FIG. 20A for one color can be arranged in parallel in the X direction for six colors. In this arrangement, simply adjusting the ejection timings of the two nozzle columns can achieve a color printing with two times the resolution of the single nozzle column.

In other technologies, such as U.S. Pat. No. 4,920,355 and Japanese Patent Application Laid-open No. 7-242025 (1995), a high resolution printing is realized by setting the paper feed distance for each print scan to a predetermined number of pixels less than the length of the column of nozzles while leaving the multi-nozzle arrangement at a low resolution. Such a printing method is hereinafter called an interlace printing method.

The interlace printing method will be briefly explained by referring to FIG. 21. Here let us take up an example case where an image with resolution of 1200 DPI (dots/inch) is printed by using a head H with nozzles arranged at a pitch of 300 DPI. For the sake of simplicity, it is assumed that the head has nine nozzles and that the distance of the paper feed carried out after each print scan is nine pixels at 1200-DPI resolution. The rasters printed in the forward pass are shown as solid lines and the rasters printed in the backward pass are shown as dashed lines. These two kinds of lines are formed alternately.

While in this example the paper is fed a fixed distance of 9 pixels at 1200-DPI resolution, other arrangements may be made in the interlace printing. The interlace printing method does not need to have a constant paper feed distance at all times as long as a picture is printed with a plurality print scans arranged at a pitch finer than the arrangement pitch of the nozzles themselves. In either base, an image can be printed with a higher resolution than he nozzle arrangement resolution.

By the various methods explained above, it has been realized to print an image with resolutions higher than a nozzle array.

On the other hand, a printing resolution of a printer is not necessarily equal to an input resolution from a host device as an image data supply source. Recent printers permit printing according to plural input resolutions. For example, when high speed processing is desired, it is possible even for a printer with a resolution of 1200 DPI to reduce a transmission time from the host device if an image data is inputted with a resolution of 300 DPI. In such a case, 17 levels which can be expressed by 4×4 pixels, in practice, are reduced to 2 levels.

Moreover, even if a printing of high quality image is required, it becomes a burden for the host device to transmit an image data of 1200 DPI. In this case, a method has already been proposed and brought into practice, wherein a multi-valued image is inputted beforehand with a resolution of 600 DPI, data amount thereof is a quarter of that of 1200 DPI, and is represented in multi-levels in 2×2 areas for printing. As one of the examples thereof, the technique disclosed in the Japanese Patent Application Laid-open No. 9-466522 (1997) will be explained below.

FIG. 22 shows an example disclosed in the specification of the above mentioned Application wherein an input data with a resolution of 300 DPI is printed with 800 DPI. In the case that an output resolution of a printer is 600 DPI to an input resolution of 300 DPI from the host device, the printer can represent the output in 5-valued gradations by 2×2 dot arrangement. When the 5 values are defined as "level" to "level 4", plural patterns can be represented in each of the levels except "level 0" and "level 4" as shown in the figure. The Japanese Patent Application Laid-open No. 9-46522 (1997) discloses the contents how these plural patterns are arranged sequentially or at random. In such a manner, a dot arrangement for forming a pixel at each gradation is not fixed, therefore, this method has an effect to reduce an pseudo-contour or what is called "sweep-up phenomenon" etc. appearing on the edge part of an image when pseudo half-tone processing is carried out. Moreover, this printing method is also effective to average the use conditions of the printing head nozzles.

Such a printing method is effective especially for a high resolution printing device. For a printer intended for realizing a photographic image, an input resolution higher than a degree of visual resolution is not necessary, but it is rather effective to improve tone of individual pixels as far as a resolution of about 600 DPI can be obtained. If the tone is further increased by using 6 color inks containing the aforementioned light inks, granular impression is decreased and a smoother image can be obtained.

As opposed to this, when an output of a fine monochrome character or pattern is desired, it is preferable to print a 2-valued image at a degree of an input resolution as the highest resolution of the printer. Thus, it becomes possible to cope with various prints according to uses while using the same printer.

When a head as shown in FIG. 20A is used, because even-numbered rasters and odd-numbered rasters that are alternated in the Y direction (sub-scan direction) are printed by different columns of nozzles, the landing positions of ink droplets from the two columns of nozzles may deviate subtly from the correct positions, degrading the image quality. One of the possible causes for this problem may be explained as follows. When a head face on which nozzles are formed is deformed due to swelling with ink or temperature rise, causing a part of the head face between the nozzle column associated with the odd-numbered rasters and the nozzle column associated with the even-numbered rasters to bulge, as shown in FIG. 20B, the ink droplets from the respective nozzle columns will be projected in two different directions slightly away from each other. The ink landing position deviation between the rasters due to this phenomenon, even if small in magnitude, will have bad effects on the image quality, and a fine image obtained by using the binarization method like an error diffusion method is particularly deteriorated in the quality. Such an image is keeping the whole smoothness by being provided with a blue noise characteristic in the dot arrangement, however, the deviation between a layer of the even-numbered rasters and a layer of the odd-numbered rasters from each other largely collapses the spatial frequency distribution, and this produces a granular impression on the whole image.

Many proposals have been put forward as to the method of correcting ink landing position deviations among different colors and, in the bi-directional printing, the method of correcting deviations in ink landing position of the same color between the forward scan and the backward scan. However, as for the correction of the ink landing position deviations between the rasters of the same color produced by the head shown in FIG. 20A, an effective adjustment method has yet to be proposed although the allowable range for the deviation is narrow and the effects of such the deviations on the image formation are large.

Further, the deviation in ejection direction between the even-numbered nozzle column and the odd-numbered nozzle column is caused by the ink composition, ink ejection history such as ejection frequency, and printing environment, as well as the characteristic variations of individual heads. For example, when printing is done successively, such a phenomenon is brought about as the printing head is increased in temperatures and the inks re decreased in the viscosity, and this results in an increase in an ink ejection speed. As the head is raised in temperatures, so the deviation amount also varies according to the temperature rises, however, since the variation returns to the former state when the printing is completed and the temperature is lowered, it has been impossible to follow this variation even though an adjusting mechanism by user is provided.

Such a problem may occur in the above interlace printing method. In the interlace printing method, because the same image area is completed by repeating the print scan and the paper feed a plurality of times, the printing time will increase. To cope with this problem, a bi-directional printing has been proposed and disclosed. In this case, the odd-numbered rasters are often printed by the forward scans and the even-numbered rasters by backward scans, as shown in FIG. 21. If the ink landing positions deviate from one raster to another, the similar problem to that when the head of FIG. 20A is used will occur.

Although many methods for correcting the landing position deviation between forward printing and backward printing were already proposed, they have been still incomplete in timely and properly coping with the problem that the ejection speed increases as the temperature rises.

If the technique disclosed by the aforesaid Japanese Patent Application Laid-open No. 9-46522 (1997) is applied, the problem of deterioration in image quality can be relaxed to some extent. However, the proposal has not originally been intended for improving the landing position deviation between even- and odd-numbered rasters, and satisfactory position adjustment for forming dots between even- and odd-numbered rasters has not been examined.

Moreover, the above mentioned Application has also disclosed the contents for varying plural patterns at random. If this proposal is applied to the above problem, an effect can surely be expectable, however, circuitry for generating plural patterns at random becomes necessary, and moreover, it is anticipated that the circuitry will be rather complex. Although the above mentioned Application proposes to generate plural patters at random, as long as there is a limit to a memory for supplying the plural patterns, it is also presupposed that a large cycle appears in the patterns in view of an entire image, and is rather conspicuous.

SUMMARY OF THE INVENTION

The present invention is made considering the above-mentioned problems, and the purpose of the invention is to make it possible to suppress deterioration in image quality caused when dot forming positions are deviated from each raster, while using a head comprising plural ejection openings arranged in the main scanning direction and permitting high resolution printing, or while bi-directionally executing an interlace printing method.

In a first aspect of the present invention, there is provided a printing method using a print head on which a plurality of print elements are arranged, the method comprising the steps of:
    forming an image on a printing medium by scanning the print head in a direction different from the arranging direction of the plurality of print elements and forming adjoining N rasters of the image in the arranging direction under different conditions; and
    allocating input image data quantized into multi-valued levels to N×N dot arrangements as pseudo half-tone processing before the image formation; the allocating step having the steps of:
        applying a plurality of the dot arrangements mutually different from each other to a same level of the input image data;
        cyclically changing the dot arrangement in the scan direction according to predetermined rules, and
        equalizing the number of dots of the adjoining N rasters in the one cycle.

In a second aspect of the present invention, there is provided a printing apparatus using a print head on which a plurality of print elements are arranged, the apparatus comprising:
    a unit for forming an image on a printing medium by scanning the print head in a direction different from the arranging direction of the plurality of print elements and forming adjoining N rasters of the image in the arranging direction under different conditions; and
    a unit for allocating input image data quantized into multi-valued levels to N×N dot arrangements as pseudo half-tone processing before the image formation; the allocating unit applying a plurality of the dot arrangements mutually different from each other to a same level of the input image data, cyclically changing the dot arrangement in the scan direction according to predetermined rules, and equalizing the number of dots of the adjoining N rasters in the one cycle.

In a third aspect of the present invention, there is provided a control method of a printing apparatus for printing by using a print head on which a plurality of print elements are arranged, the method comprising the steps of:
    controlling the print head to form adjoining N rasters of an image in the arranging direction of the plurality of print elements under different conditions when the image on a printing medium is formed by scanning the print head in a direction different from the arranging direction; and
    allocating input image data quantized into multi-valued levels to N×N dot arrangements as pseudo half-tone processing before the image formation; the allocating step having the steps of:
        applying a plurality of the dot arrangements mutually different from each other to a same level of the input image data;
        cyclically changing the dot arrangement in the scan direction according to predetermined rules, and
        equalizing the number of dots of the adjoining N rasters in the one cycle.

In a fourth aspect of the present invention, there is provided a program for performing a control method of a printing by means of a computer, the apparatus for printing by using a print head on which a plurality of print elements are arranged, the method comprising the steps of:
    controlling the print head to form adjoining N rasters of an image in the arranging direction of the plurality of print elements under different conditions when the image on a printing medium is formed by scanning the print head in a direction different from the arranging direction; and
    allocating input image data quantized into multi-valued levels to N×N dot arrangements as pseudo half-tone processing before the image formation; the allocating step having the steps of:
        applying a plurality of the dot arrangements mutually different from each other to a same level of the input image data;
        cyclically changing the dot arrangement in the scan direction according to predetermined rules, and
        equalizing the number of dots of the adjoining N rasters in the one cycle.

In any one of the above aspects, in the equalization, differences in a covering ratio of the printing medium with formed dots may be put within 10% or less in a range where the adjoining N rasters are deviated from each other by at least ±2 pixels in the scan direction.

The print head may have N columns of print elements arranged side by side in the scan direction, the N columns of print elements may be shifted from each other by an amount less than a pitch at which the print elements are arranged in the column, and the N columns of print elements may print the N rasters.

The print head may be operated to scan the printing medium in the forward and backward directions, and image formation may be carried out by relatively transporting the printing medium in a direction perpendicular to the scan directions by quantities for printing at a density higher than the arranging density of the plurality of print elements between the forward and backward scanning, and the printing of the N(=2) rasters may be carried out by the scanning in the forward and backward directions.

The above method or apparatus may further comprises a step of or means for carrying out an adjustment of drive timings to the plurality of print elements in the N rasters.

The print head may be the one which carries out printing by ejecting ink, and the print elements may have ejection openings for ejecting the ink.

Here, the print head may have heating elements to generate thermal energy for causing film boiling in ink as an energy for ejecting ink from the ejection openings.

The above and other objects, effects, features and advantages of the present invention will become more apparent from the following description of embodiments thereof taken in conjunction with the accompanying drawings.

BRIEF DESCRIPTION OF THE DRAWINGS

FIG. 24 is an example pattern output during the process of the user registration of FIG. 16A.

DESCRIPTION OF THE PREFERRED EMBODIMENTS

Embodiments of the printing apparatus according to the present invention will be described by referring to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The word "print medium" or "print sheet" include not only paper used in common printing apparatus, but cloth, plastic films, metal plates, glass, ceramics, wood, leather or any other material that can receive ink. This word will be also referred to "paper".

Further, the word "ink" (or "liquid") should be interpreted in its wide sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
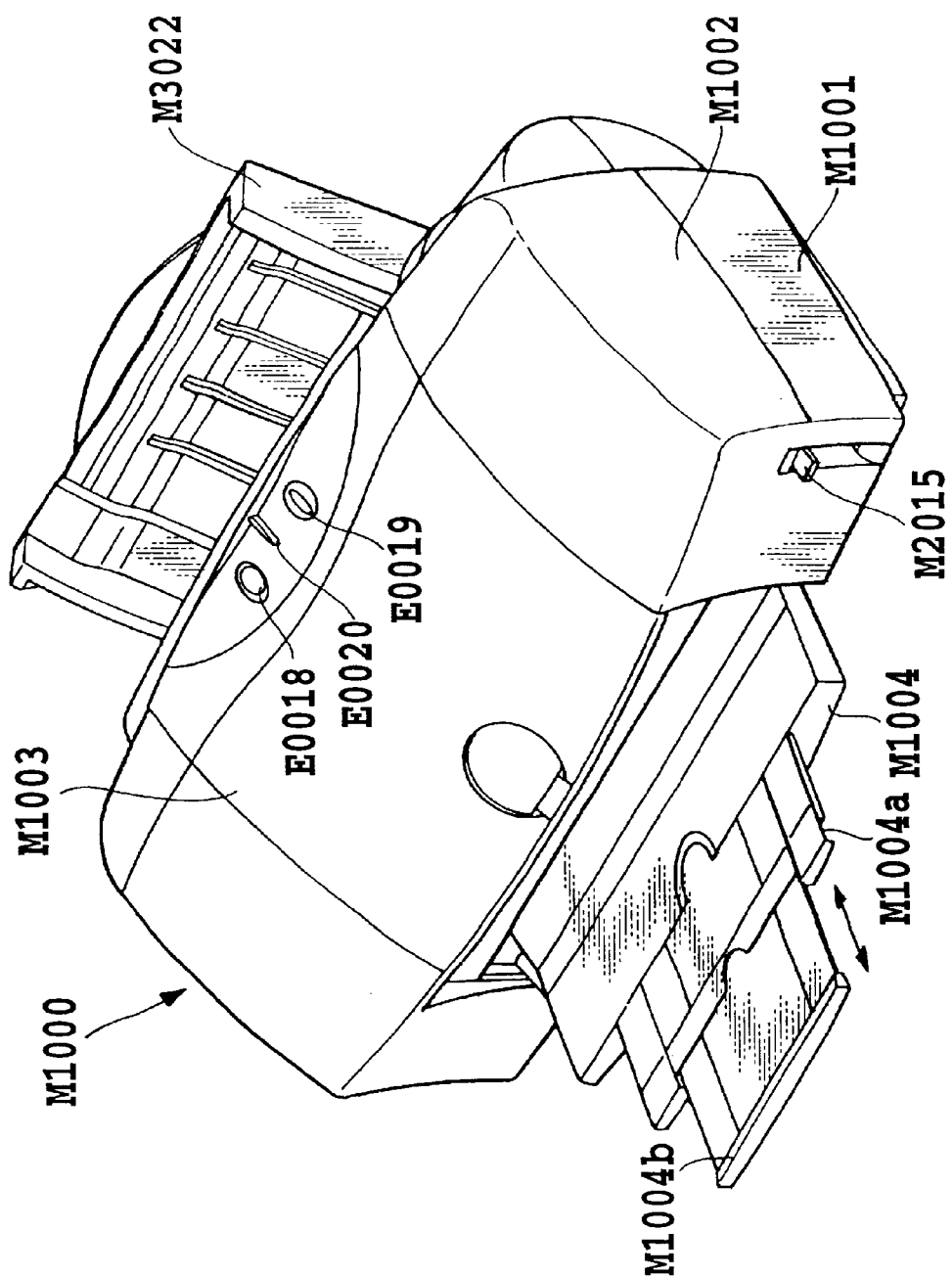
FIG. 1 is a perspective view showing an external construction of an ink jet printer as one embodiment of the present invention.
Figure 2:
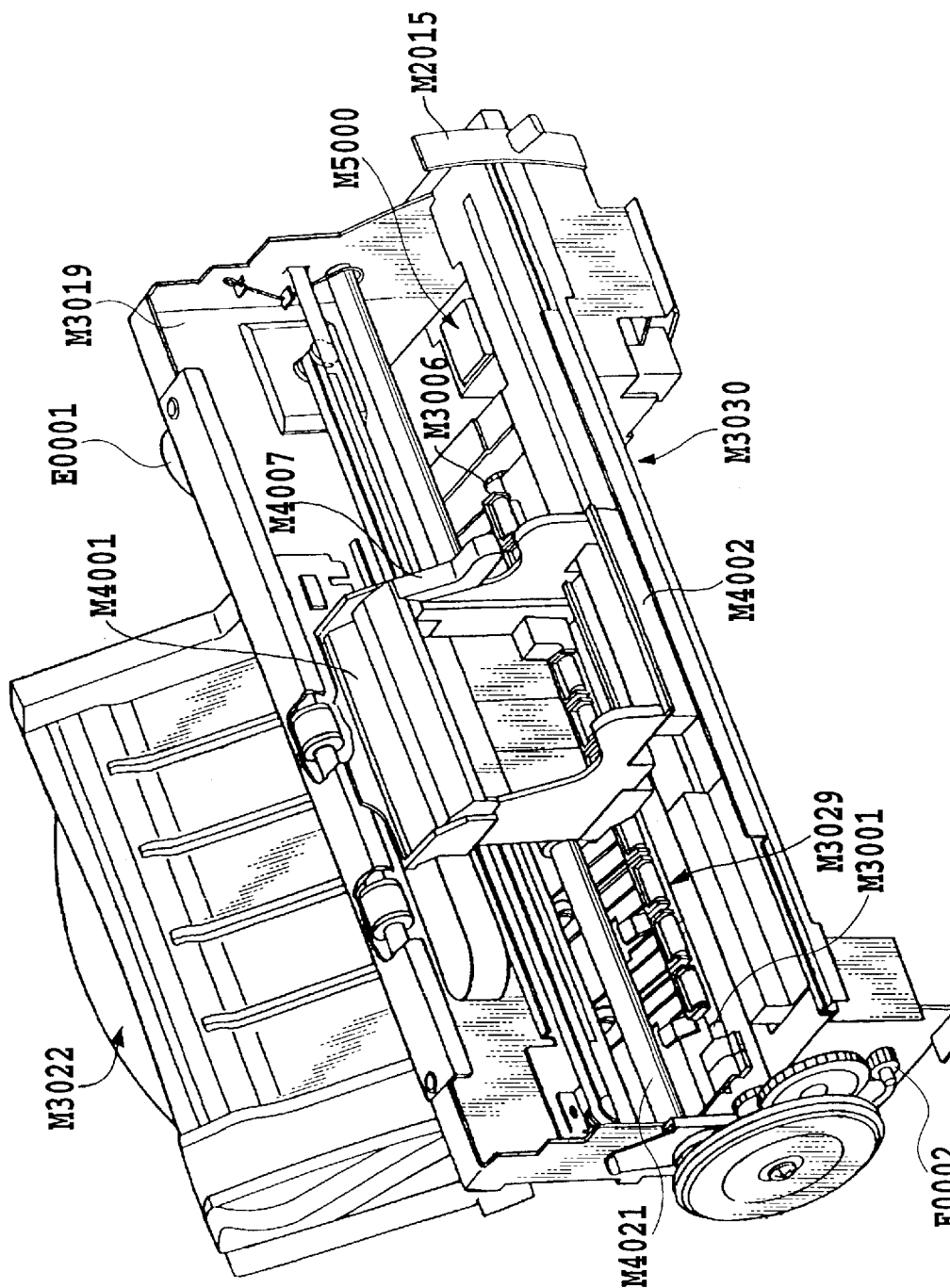
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001.

When the print operation is to be performed, the discharge tray M1004 is rotated forwardly to open the opening so that printed sheets can be discharged and successively stacked. The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

First, the print head cartridge used in the print unit will be described with reference to FIGS. 3 to 5.

Figure 3:
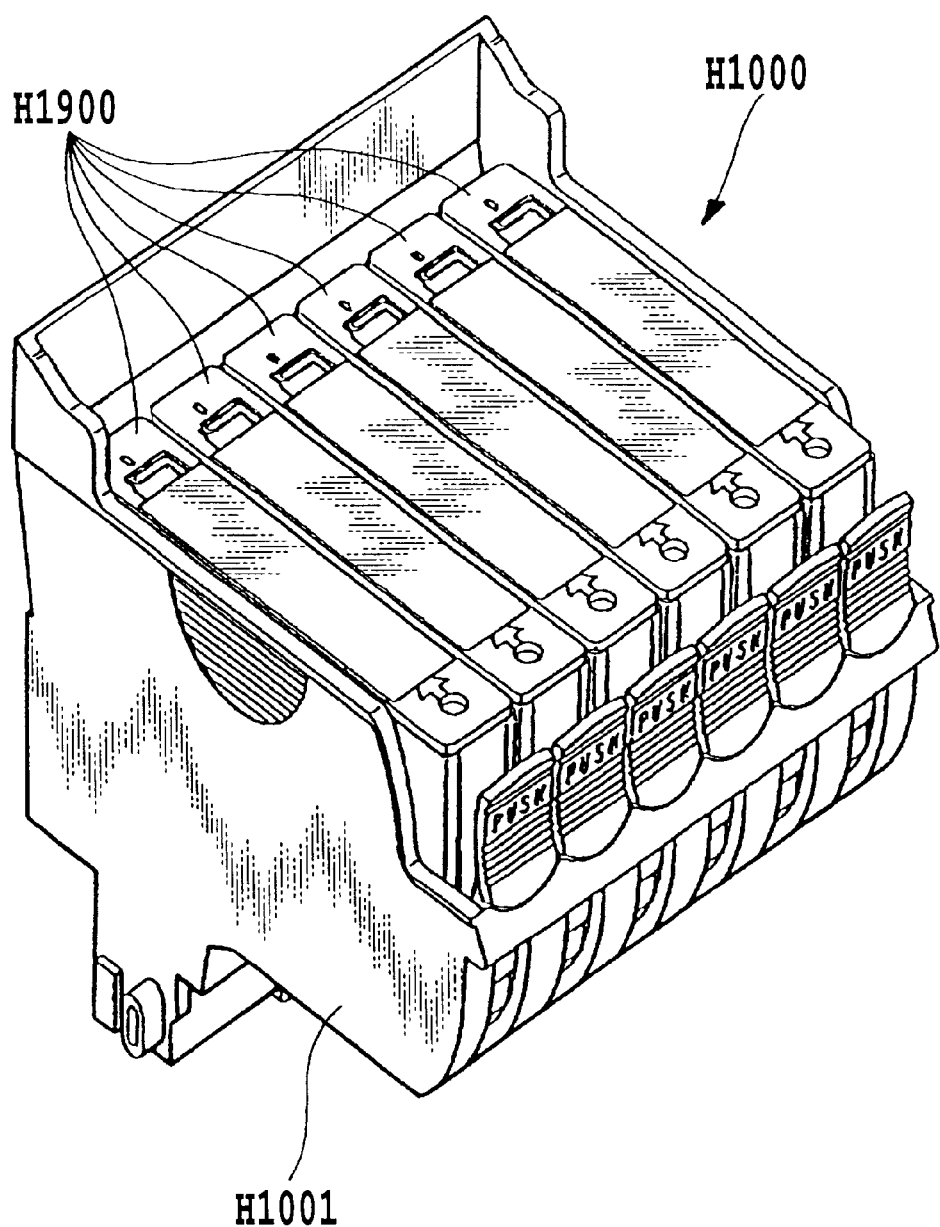
FIG. 3 is a perspective view showing an assembled print head cartridge used in the printer of one embodiment of the present invention.
Figure 4:
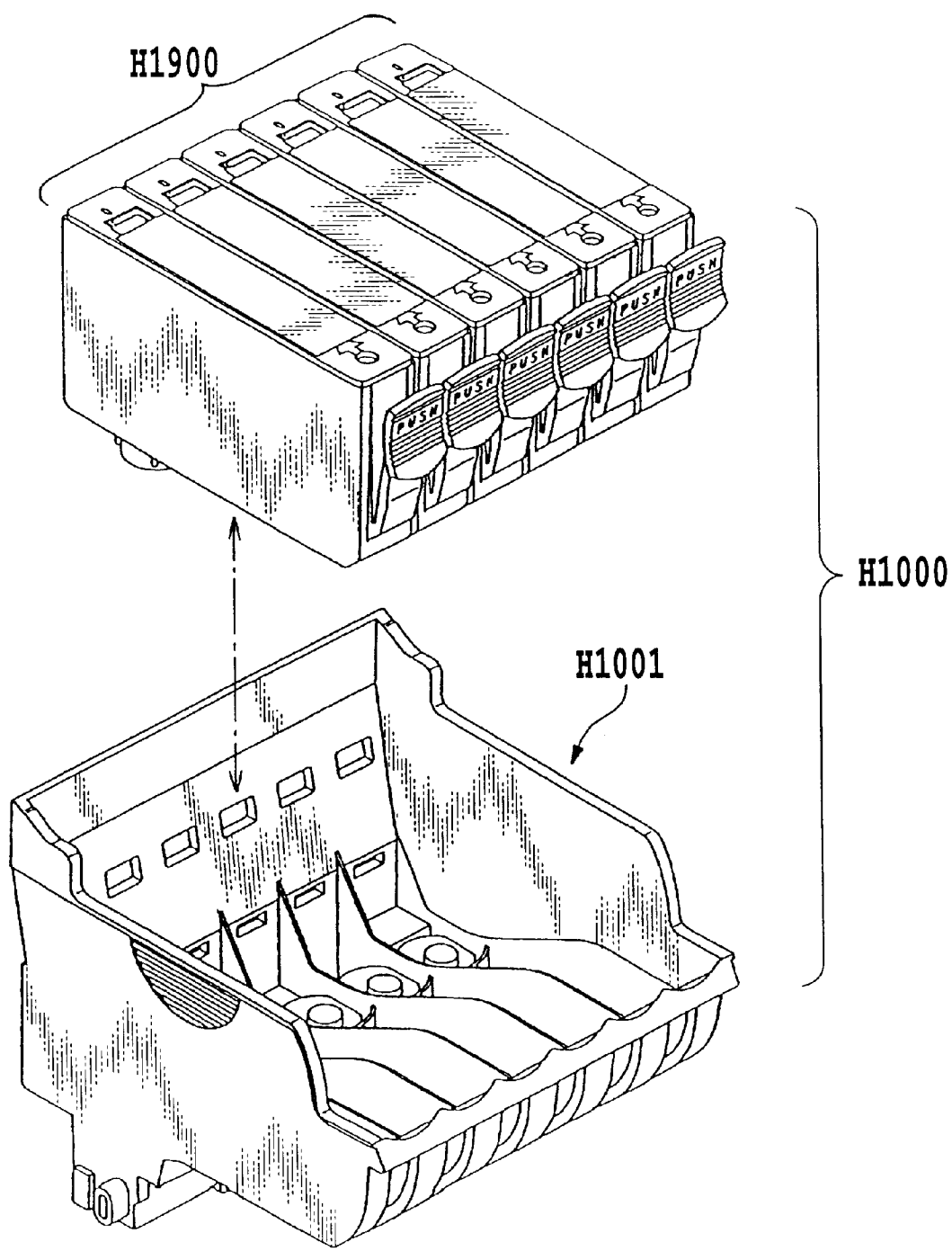
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph. As shown in FIG. 4, these individual ink tanks are removably mounted to the print head H1001.

Figure 5:
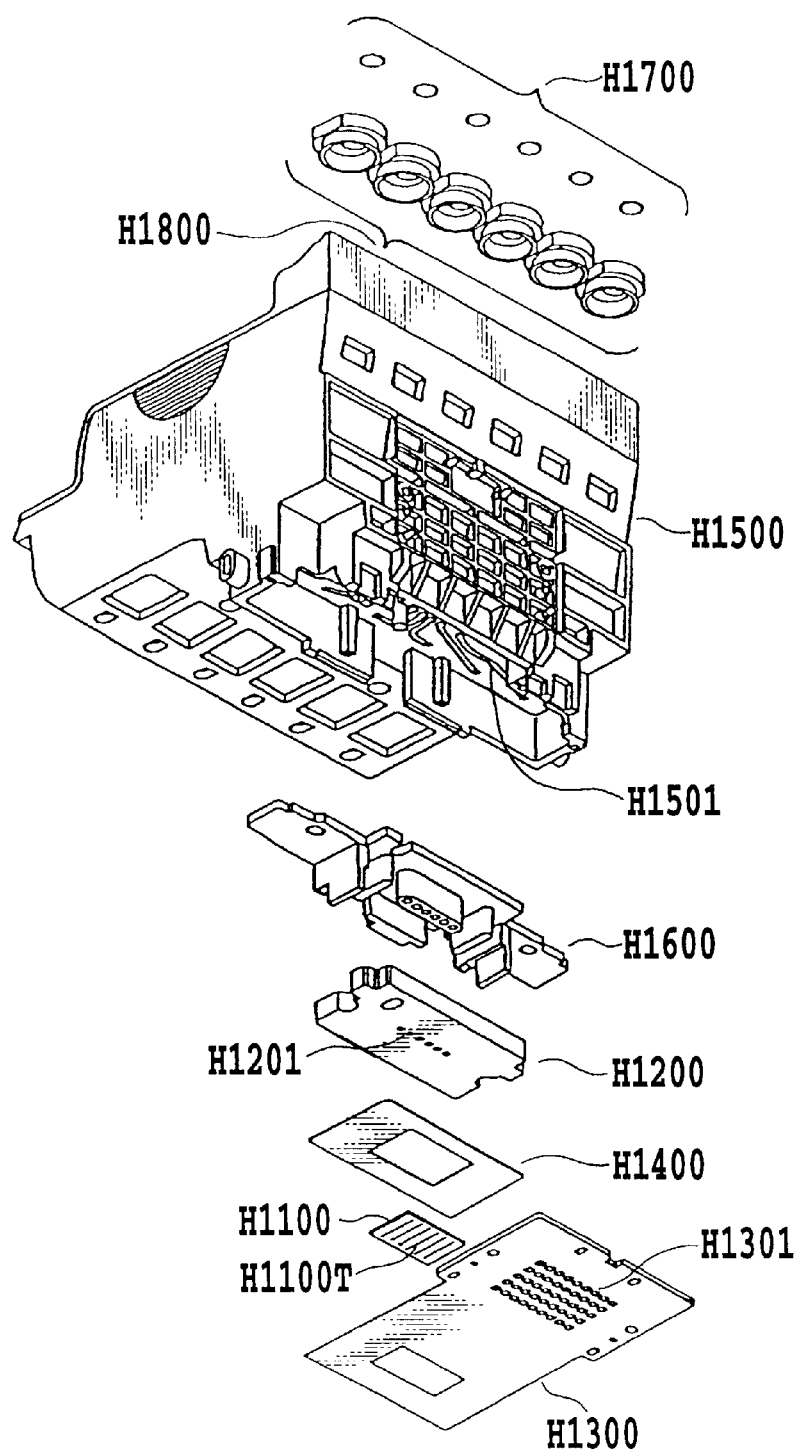
FIG. 5 is an exploded perspective view of the print head of FIG. 4 as seen diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages.

The print element substrate H1100 is securely bonded to the first plate H1200 which is formed with ink supply ports H1201 for supplying ink to the print element substrate H110. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member not shown, such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figures 6A, 6B:
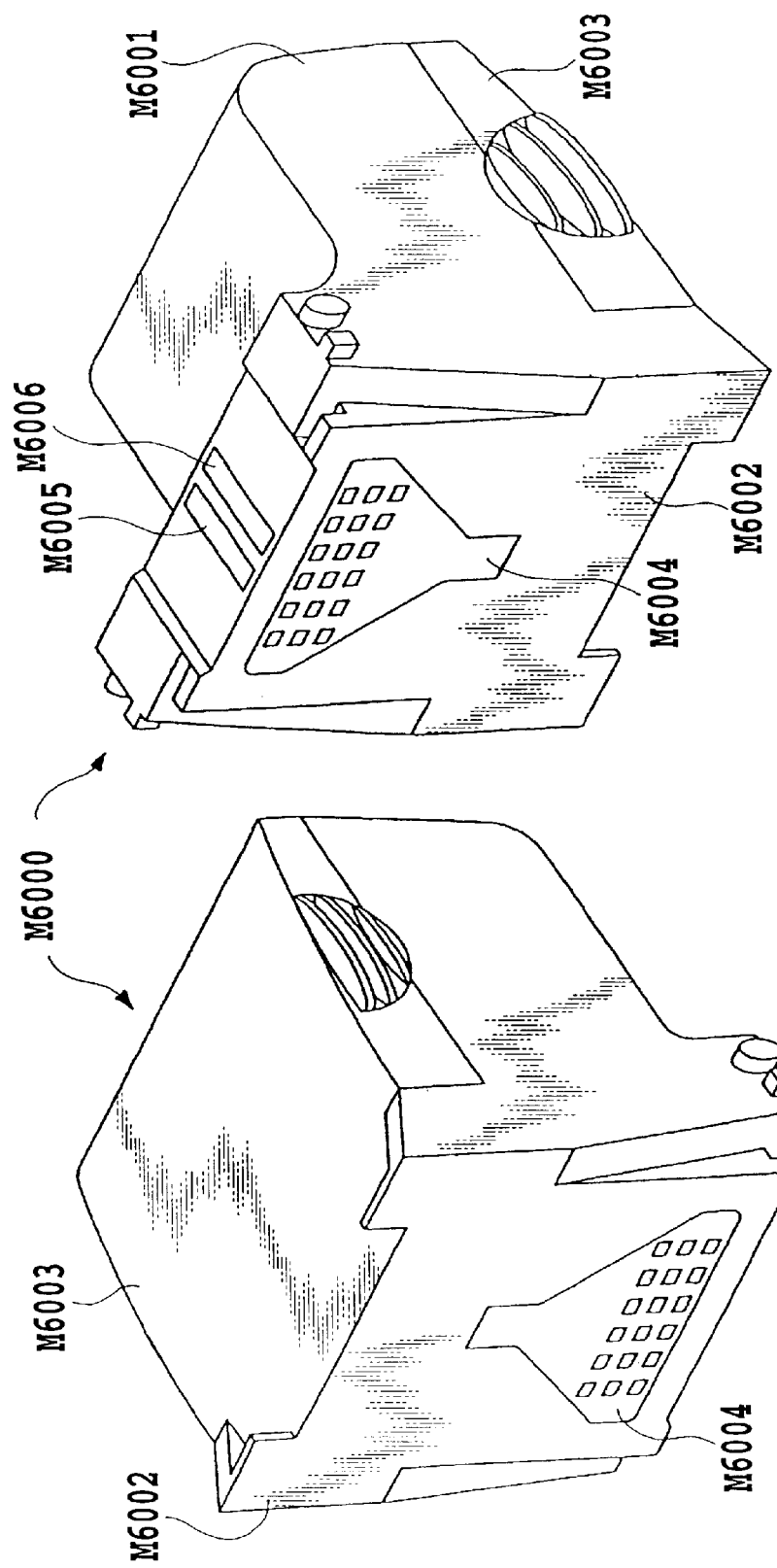
FIGS. 6A and 6B are perspective views showing a construction of a scanner cartridge upside down which can be mounted in the printer of one embodiment of the present invention instead of the print head cartridge of FIG. 3.

FIGS. 6A and 6B show the scanner M6000 upside down to explain about its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
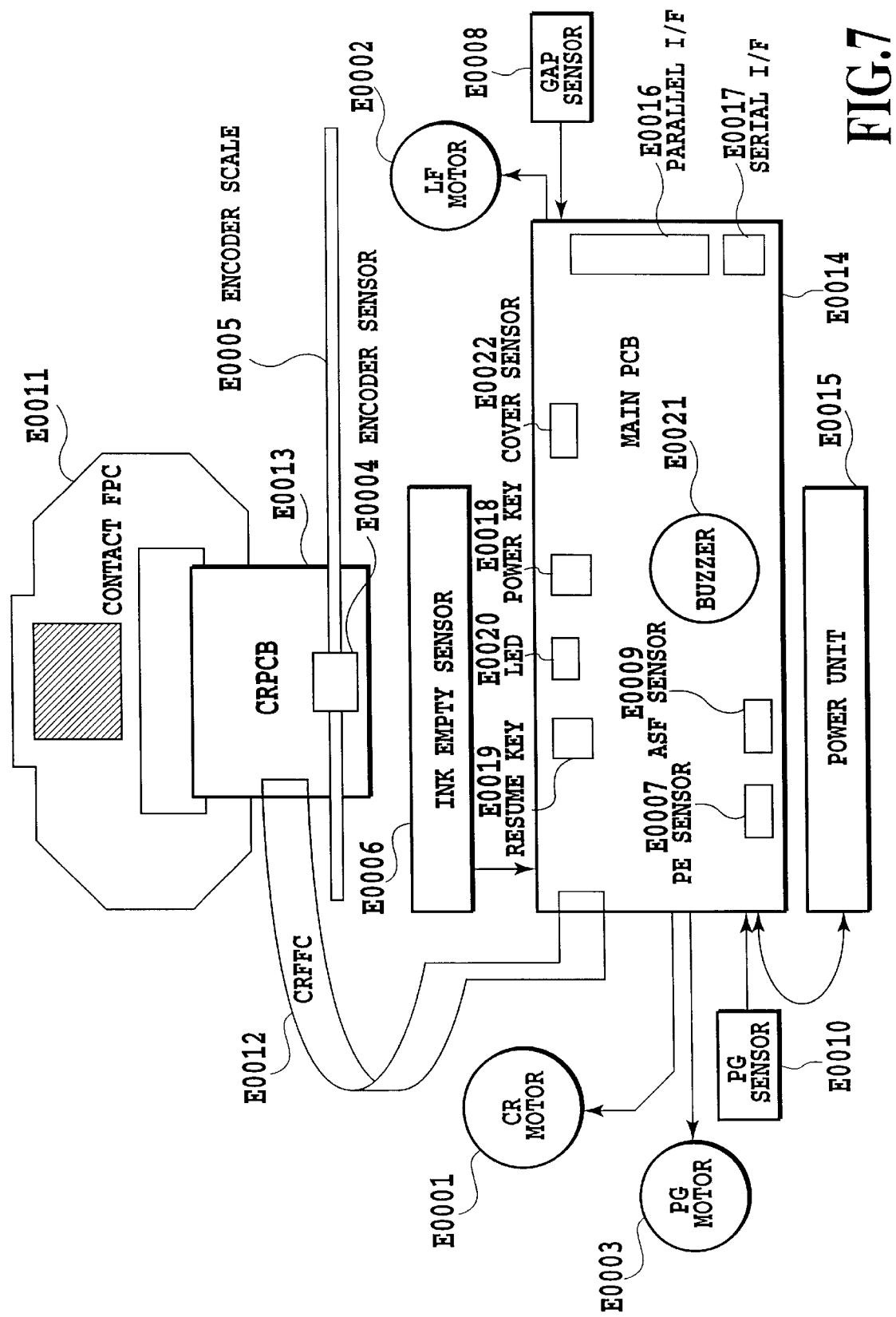
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 hat constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 8B:
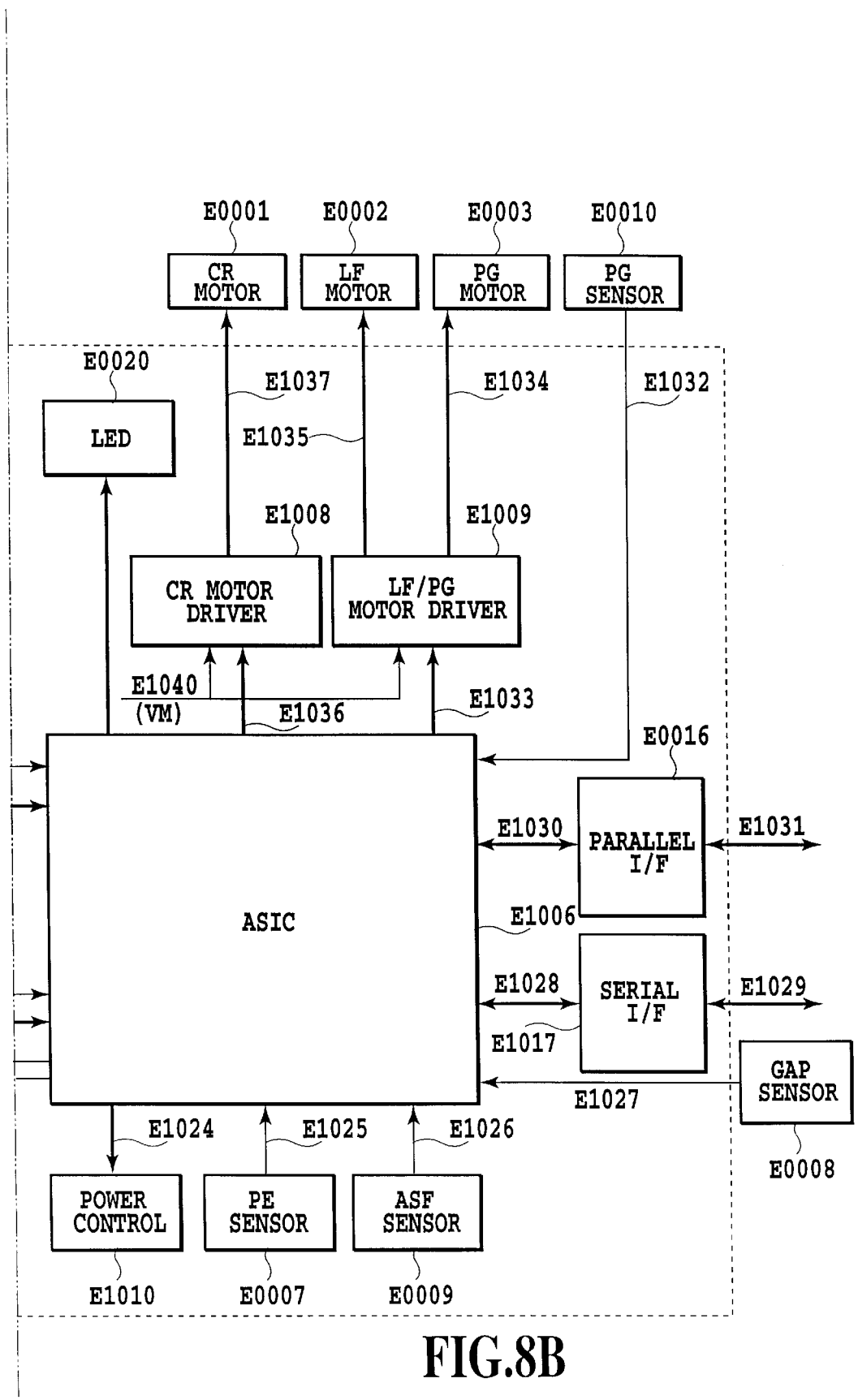
FIG. 8 is a diagram showing the relation between FIGS. 8A and 8B, FIGS. 8A and 8B being block diagrams representing an example inner configuration of a main printed circuit board (PCB) in the electric circuitry of FIG. 7.

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor.

The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
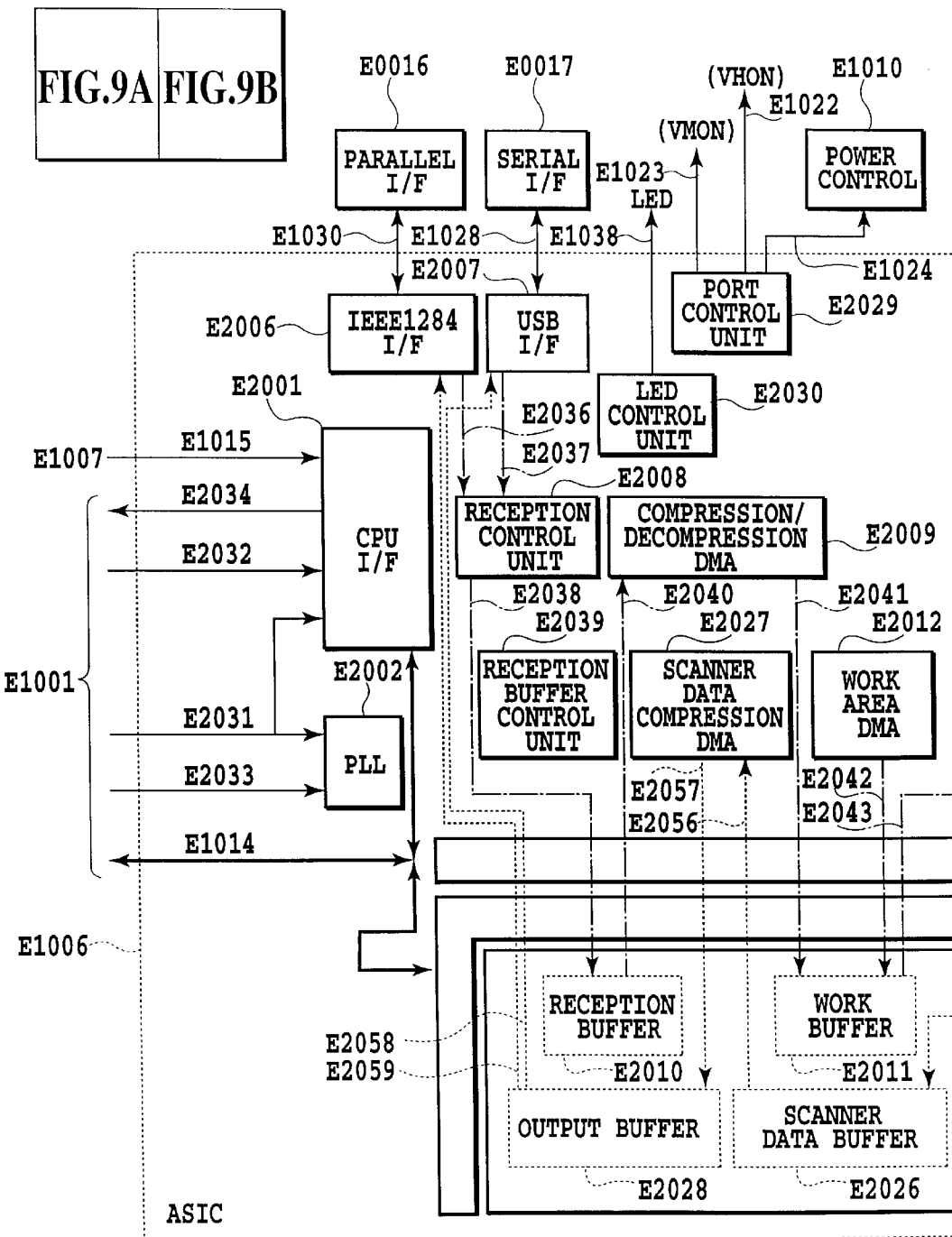
FIG. 9 is a diagram showing the relation between FIGS. 9A and 9B, FIGS. 9A and 9B being block diagrams representing an example inner configuration of an application specific integrated circuit (ASIC) in the main PCB of FIGS. 8A and 8B.
Figure 9B:
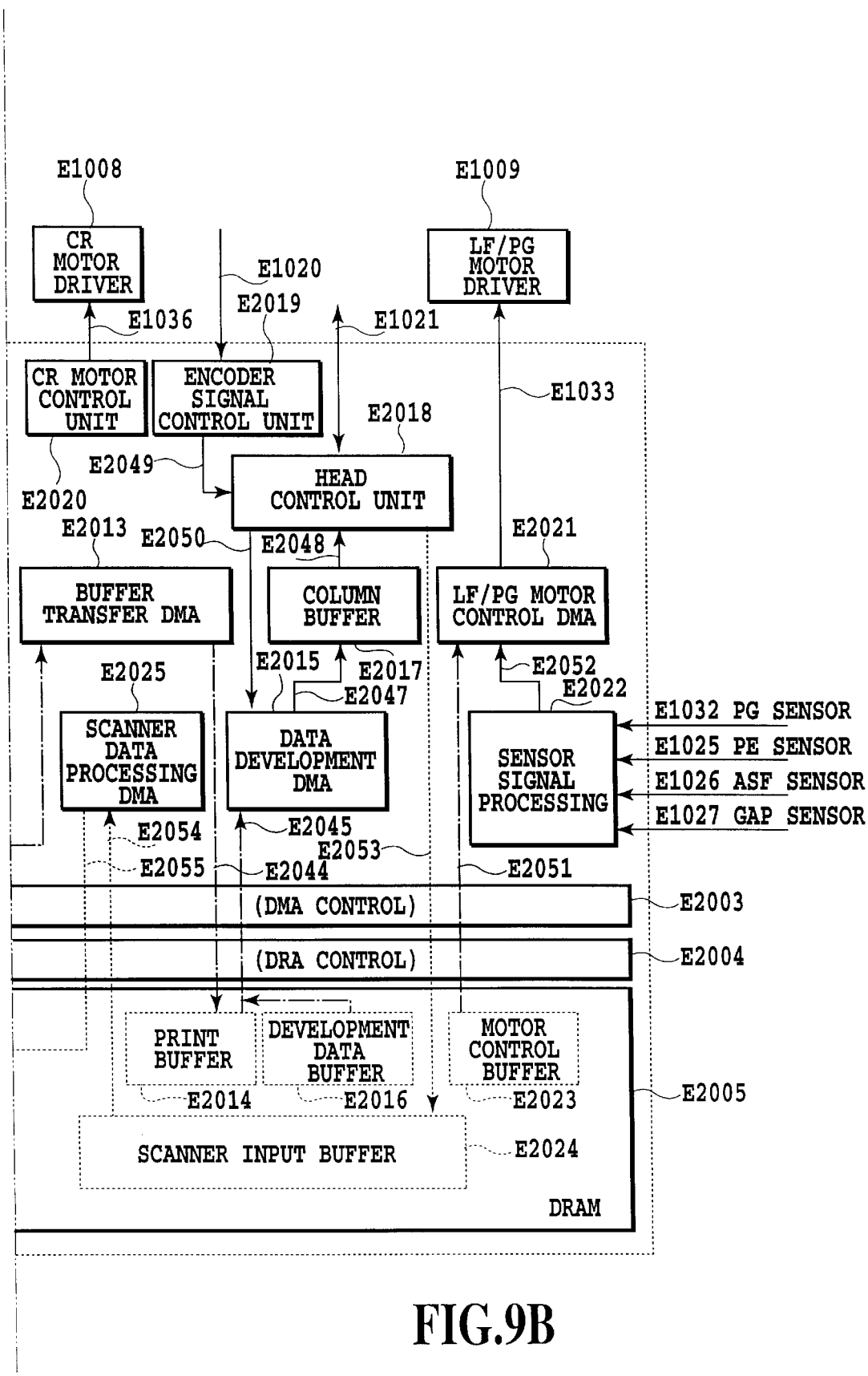

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. Operation of Printer

Figure 10:
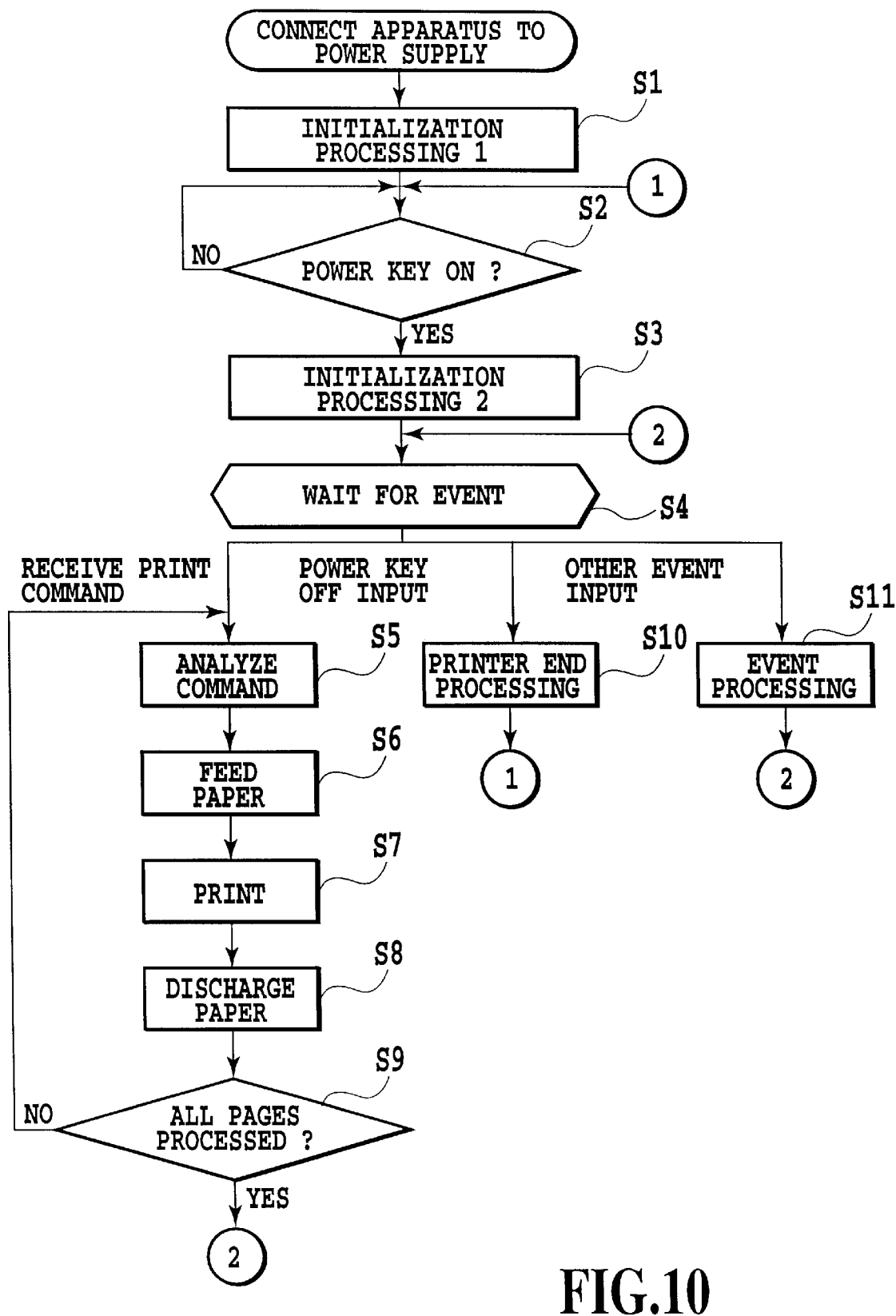
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer.

Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

6. Head Configuration

The construction and arrangement of nozzles in the print head H1001 used in this embodiment will be described.

Figure 11:
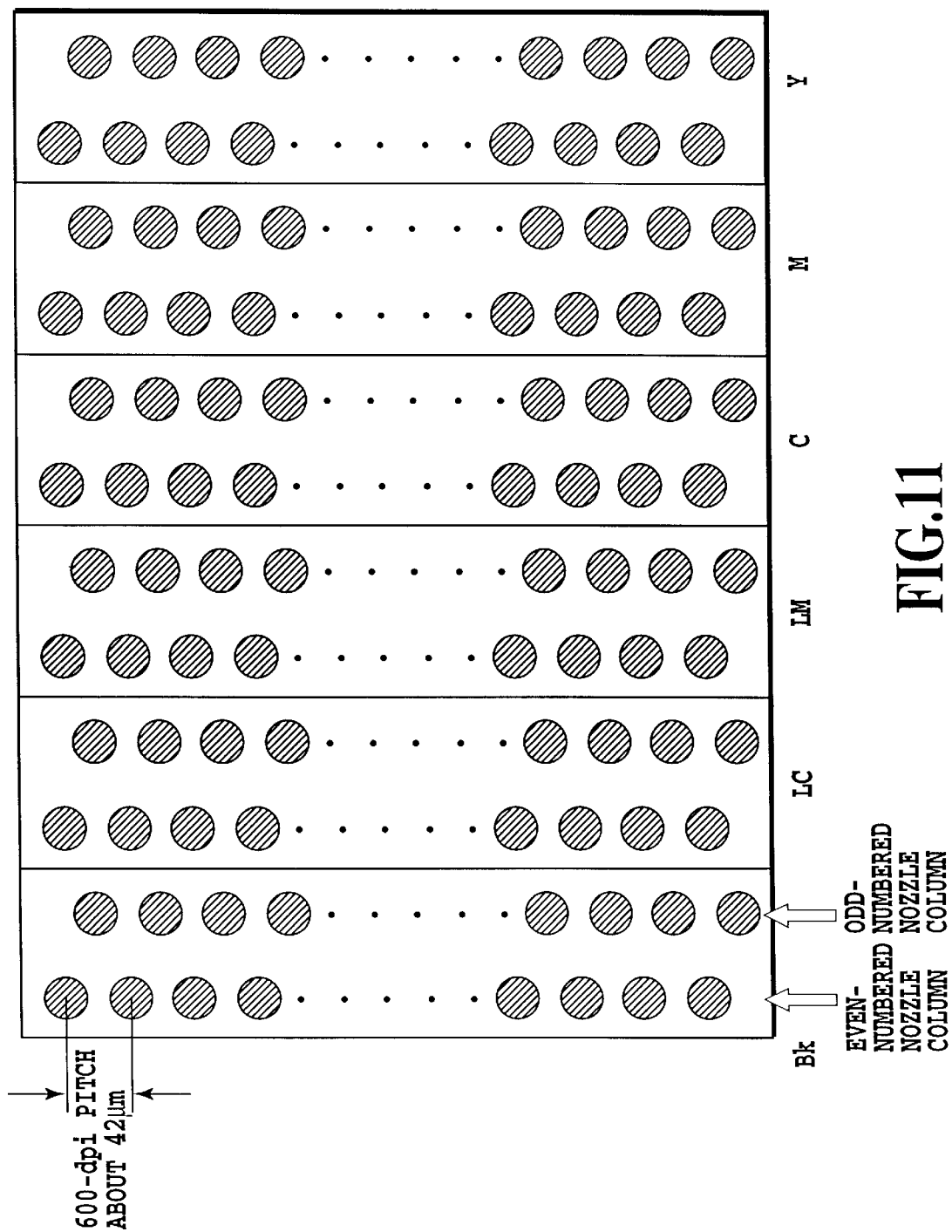
FIG. 11 is a schematic diagram showing an example of nozzle arrangement on the print head used in one embodiment of the present invention.

FIG. 11 is a schematic front view of the head used in this embodiment to realize high resolution printing. In this example, two parallel columns each having 128 nozzles are spaced from each other in the main scan direction (carriage scan direction) and staggered or shifted by about 21 $\mu$m from each other in the sub-scan direction (paper feed direction), with the 128 nozzles in each column arranged at a 600-DPI pitch (about 42 $\mu$m pitch). These two nozzle columns are used for each color and therefore a total of 256 nozzles are used to achieve a 1200 DPI resolution for each color. Further, in the example shown, the print head has 12 such nozzle columns integrally arranged side by side in the main scan direction to produce six colors with the 1200 DPI resolution. In the process of manufacture, the columns of two adjoining colors are fabricated simultaneously in one chip and then three such chips are bonded side by side. Hence, the nozzle columns of two adjoining colors in each chip (a set of black (Bk) and light cyan (LC), a set of light magenta (LM) and cyan (C) and a set of magenta (M) and yellow (Y)) have more similar driving conditions than other colors.

7. Printing Method

This printing method is explained assuming that the print head shown in FIG. 11 for the use in this embodiment is capable of printing with a resolution of 1200 DPI, however, an input resolution in this example is 600 DPI at the maximum, and the print head prints one input data by 2×2 four pixels at the time of printing. Each data has five gradations, and the dot arrangements to each gradation are determined beforehand in 2×2 pixels so that 5-level gradations are represented in the 2×2 pixel areas at the time of printing. In this case, as described about FIG. 22, there exist plural patterns for "level 1" to "level 3".

Figure 12A:
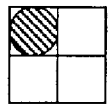
FIGS. 12A to 12C illustrate examples each showing a dot arranging pattern defined to different input gradation levels and the states of dot formation by the head shown in FIG. 11 with comparing them each other.
Figure 12A:
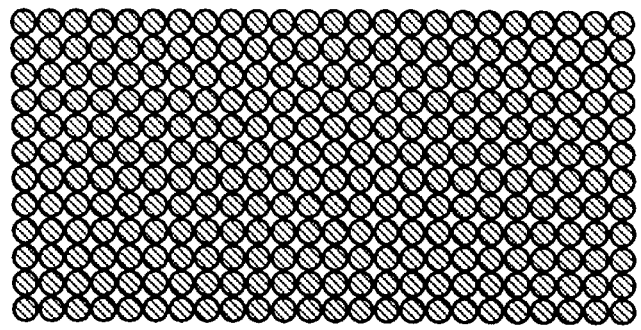
Figure 12B:
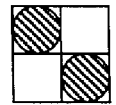
Figure 12B:
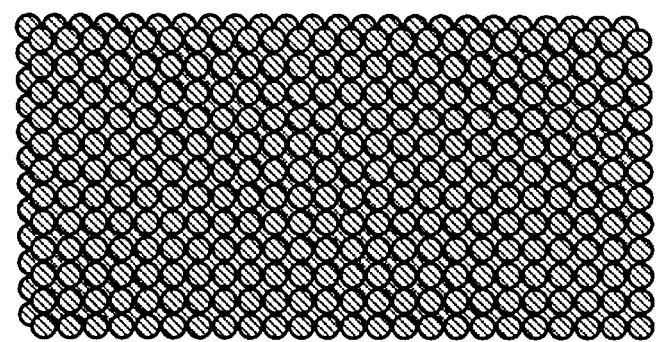
Figure 12C:
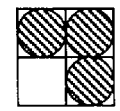
Figure 12C:
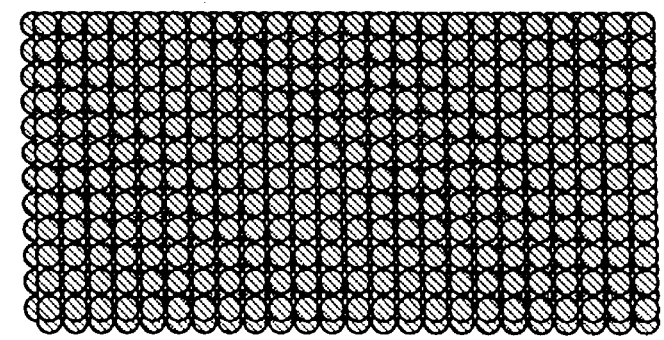

For example, in the case of pursuing, above all, smoothness of an image, it is recommended to form dot arrays in a single pattern for each gradation also concerning "level 1" to "level 3 ". In such a manner, each dot is most evenly arrayed as shown in FIGS. 12A to 12C, therefore, the image can have high uniformity.

However, in this way, some nozzles are frequently used comparing with other. Namely, with the "level 1" defined as shown in FIG. 12A, only the odd-numbered nozzles are used (in this specification, unless otherwise mentioned, the nozzle generally refers to an ejection opening, a liquid passage communicating with the ejection opening and an element for generating energy used to eject ink), and with the "level 3" defined as shown in FIG. 12C, a utilizing ratio of the odd-numbered nozzles to the even-numbered nozzles becomes 2 to 1, and this shows the former is higher than the latter. If particular nozzles are burdened heavier in this way, a life of a multi-nozzle print head is shorten.

Therefore, the printing apparatus in this embodiment is arranged to use the even-numbered nozzles and the odd-numbered nozzles as even as possible.

Figure 13A:
FIGS. 13A to 13C illustrates other examples each showing a dot arranging pattern defined to different input gradation levels and the state of dot formation by the head shown in FIG. 11 comparing them with each other.
Figure 13A:
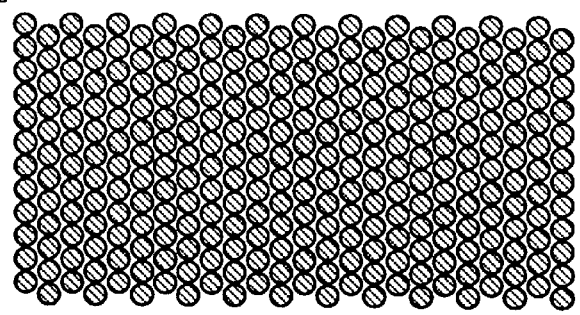
Figure 13B:
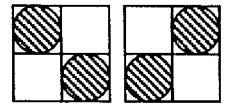
Figure 13B:
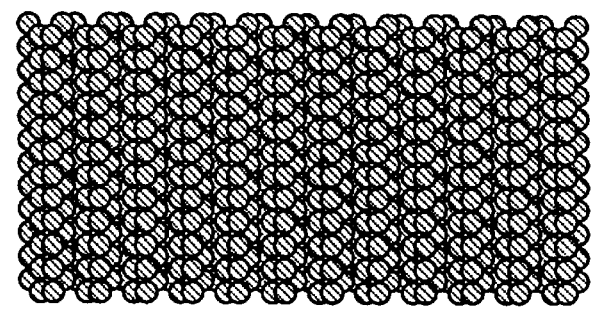
Figure 13C:
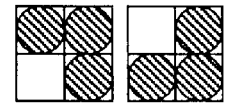
Figure 13C:
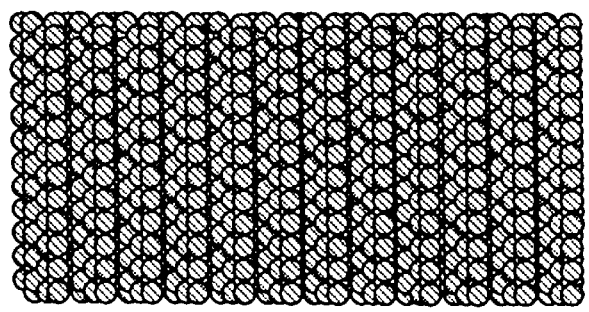

FIGS. 13A to 13C show dot arranging patterns where consideration has been taken not to lose uniformity of a whole image as much as possible while uniformalizing such burdens. Here, in each case of "level 1" to "level 3" shown in FIGS. 13A to 13C, two kinds of patterns are alternately arranged so that the even- and odd-numbered rasters are evenly printed. By using these patterns, it is possible to evenly burden the nozzles also while keeping the uniformity of the image smooth.

However, these patterns bring about a harmful influence when deviation in dot forming positions occurs between the even- and odd-numbered rasters.

Figure 14A:
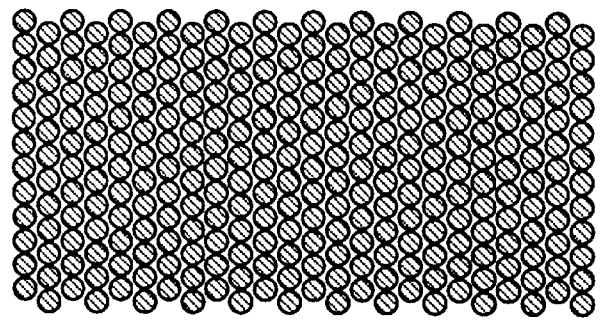
FIGS. 14A to 14D, in the case of using the dot arranging patterns shown in FIG. 13A, illustrate the states in which only an even-numbered raster is shifted to the left by one pixel to three pixels from the state without deviation in dot forming position, in order to explain a harmful influence when deviation in dot forming position occurs between the even- and odd-numbered rasters.
Figure 14B:
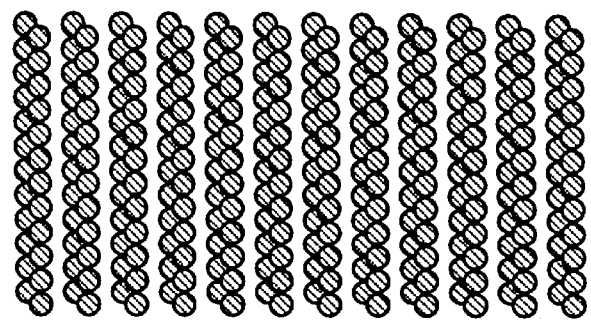
Figure 14C:
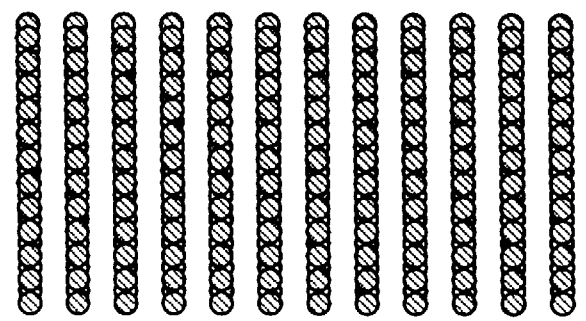
Figure 14D:
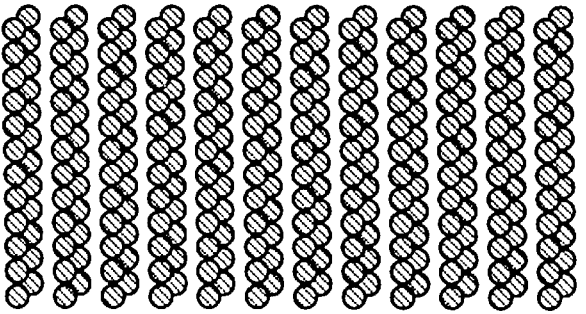

FIGS. 14A to 14D show the results of the influence. Here, in "level 1", these patterns show firstly the states (FIG. 14A) where there is no deviation in dot forming positions between the even- and odd-numbered rasters and then the states (FIGS. 14B to 14D ) where only even-numbered raster is shifted or deviated to the left pixel by pixel in the respective cases. Moreover, these patterns are in line with the actual ink dot forming of the printer used in this embodiment, and the dot diameter is made to 45 $\mu$m with respect to pixel size of 21 $\mu$m in print resolution of 1200 DPI. From these results, it can be seen that the individual dots are completely separated from each other in the state without deviation (FIG. 14A), while one-pixel deviation causes overlaps of dots (FIG. 14B), and two-pixel deviation makes them overlap almost in line (FIG. 14C). The area where the ground portion of the printing medium appears as it is (blank paper area) increases by the overlapped portion, and this is visually perceived as a decrease in density. And the blank area peaks at two-pixel deviation, and the covering ratio increases again at three-pixel deviation (FIG. 14D) and the overlap is reset at four-pixel deviation.

Figure 15:
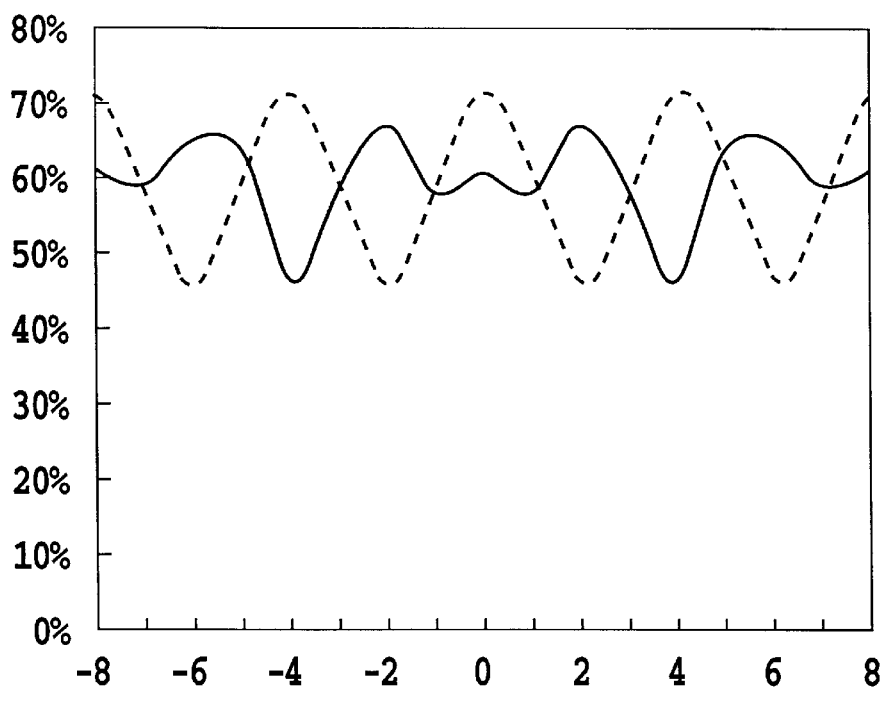
FIG. 15 is a chart for explaining a relation between deviation amount of dot forming position and a covering lo ratio on a printing medium.

FIG. 15 shows the relation between the covering ratio and the dot deviation, and the relation in the case of "pattern 1"

is shown by the broken line. Thus, it can be seen that when the dot arranging patterns as shown in FIGS. 13A to 13C are used, the covering ratios are varying from 45% to 70% in amplitude.

FIGS. 16A to 16D show dot arranging patterns improved on FIGS. 13A to 13C. Since there are already overlapping portions with adjacent dots from the step of "level 1", the covering ratio is lower than the cases in FIG. 13. Although the uniformity is inferior to that of the arranging patterns in FIG. 13, which is not actually perceptible at the print resolution of 1200 DPI, since these figures are the enlarged views either way.

Figure 17A:
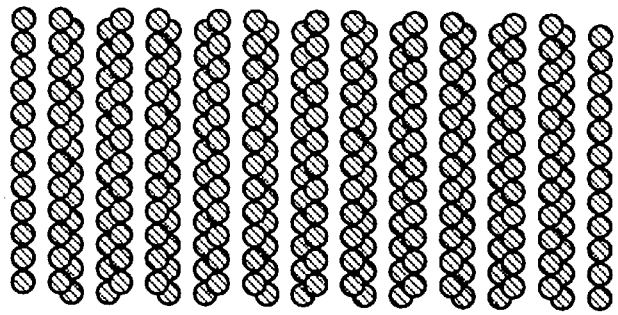
FIGS. 17A to 17D, in the case of using the dot arranging patterns shown in FIG. 16A, illustrate the states in which only an even-numbered raster is shifted to the left by one pixel to three pixels from the state without deviation in dot forming position, in order to explain a harmful influence when deviation in dot forming position occurs between the even- and odd-numbered rasters or when deviation in dot forming position occurs in bi-directional printing.
Figure 17B:
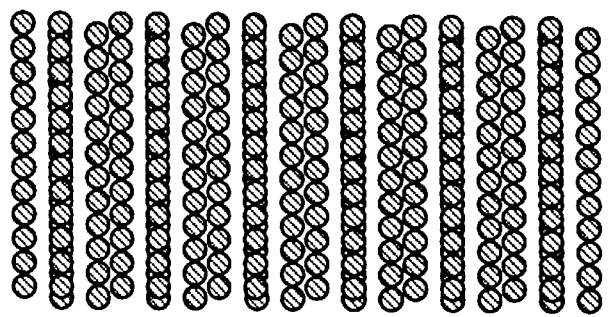
Figure 17C:
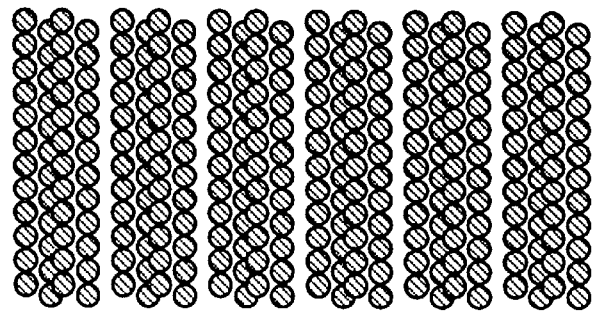
Figure 17D:
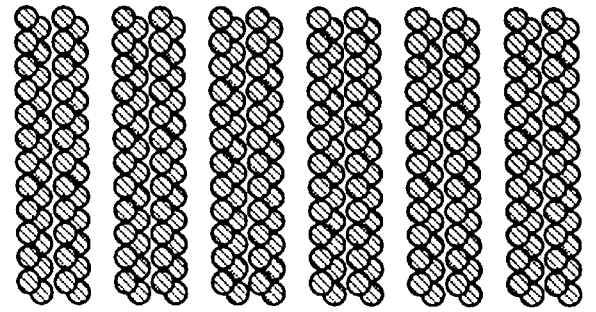
Figure 18A:
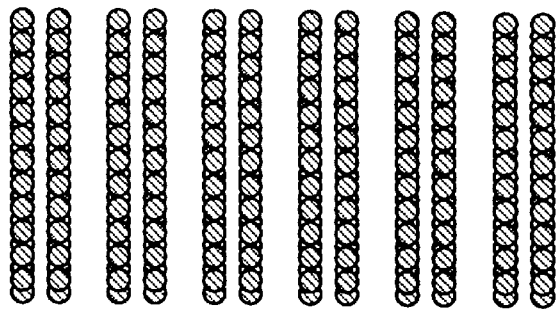
FIGS. 18A to 18D, in the case of using the dot arranging patterns shown in FIG. 16A, illustrate the states in which only an even-numbered raster is shifted to the left by one pixel from four pixels to seven pixels in dot forming position, in order to explain a harmful influence when deviation in dot forming position occurs between the even- and odd-numbered rasters or when deviation in dot forming position occurs in bi-directional printing.
Figure 18B:
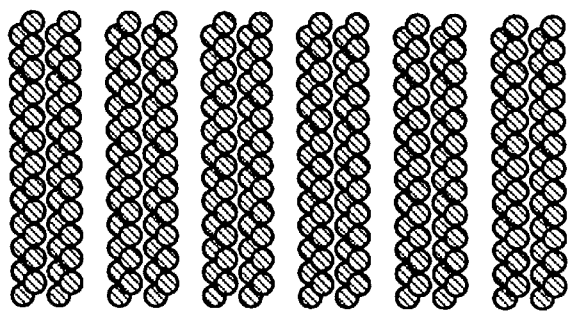
Figure 18C:
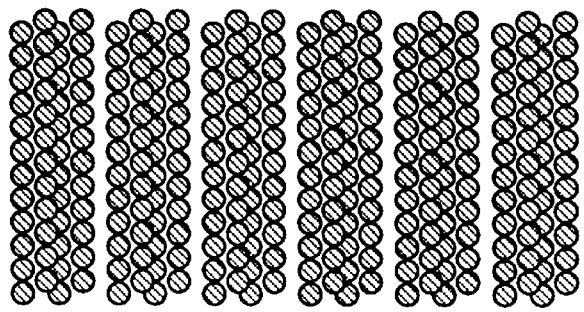
Figure 18D:
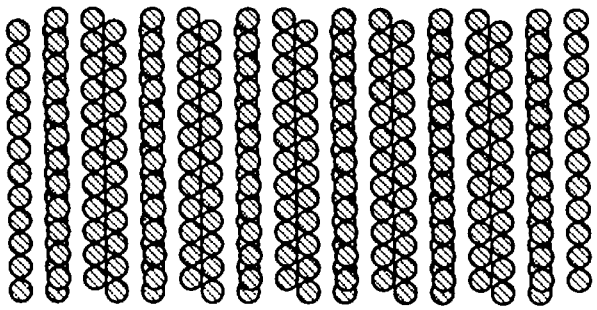
Figure 19:
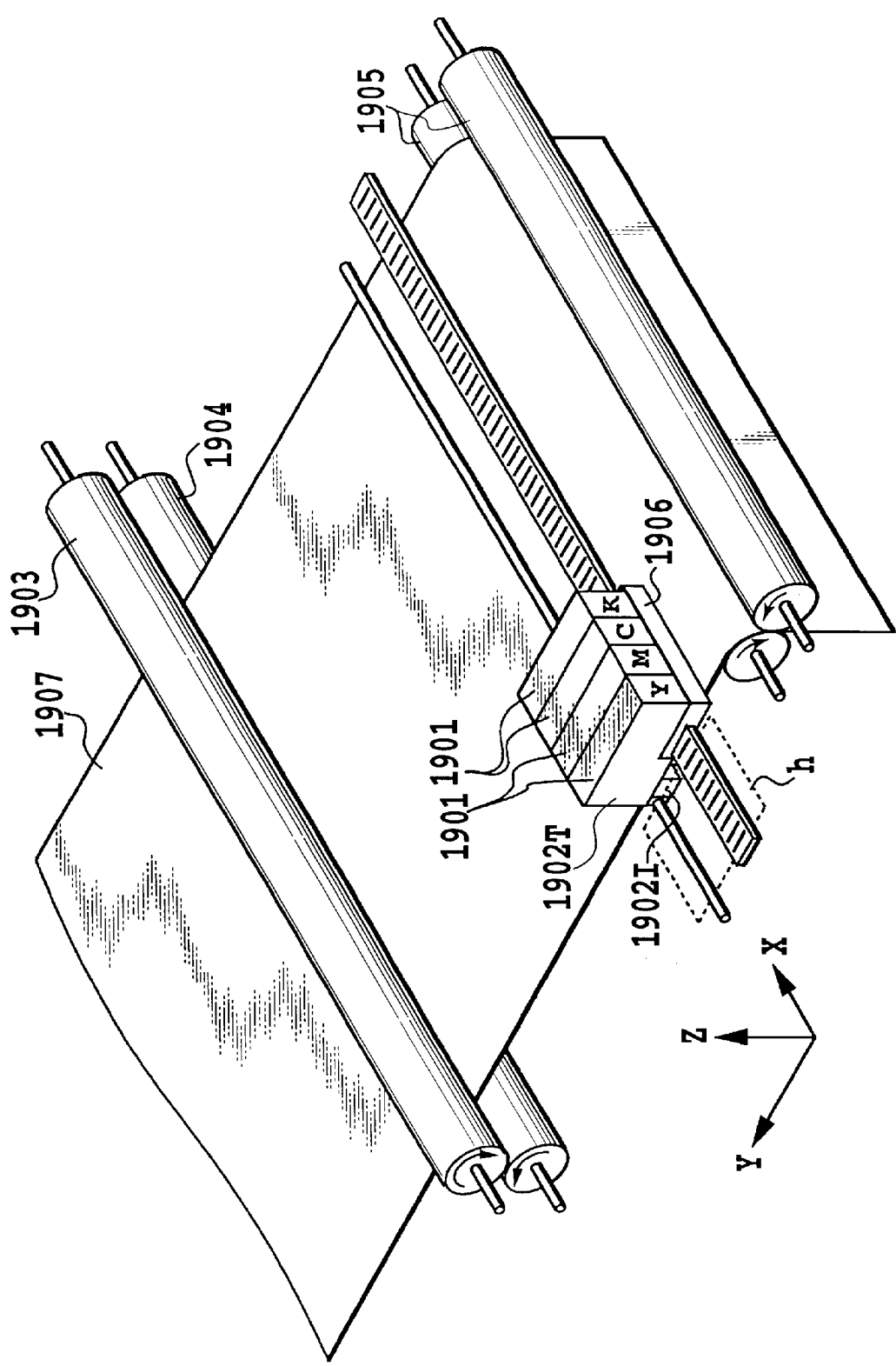
FIG. 19 is a perspective view showing simplified serial type color printer.
Figure 20A:
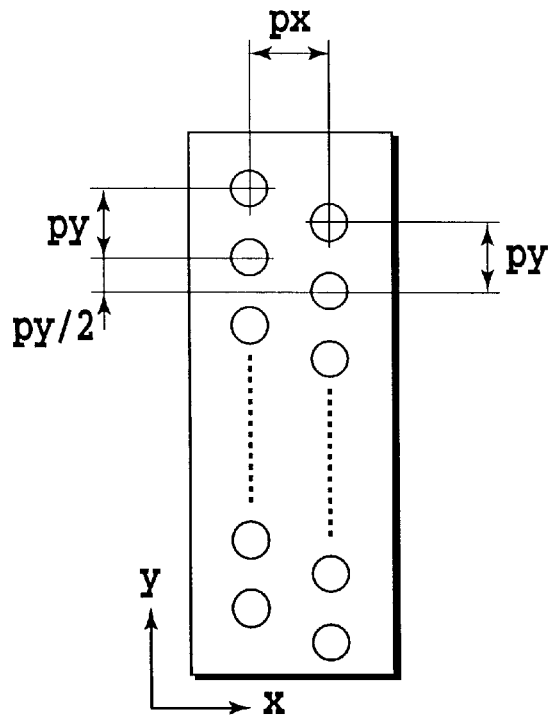
FIGS. 20A and 20B are a diagram showing an example of nozzle arrangement on the print head to realize a high resolution and a diagram showing a problem in realizing the high resolution, respectively.
Figure 20B:
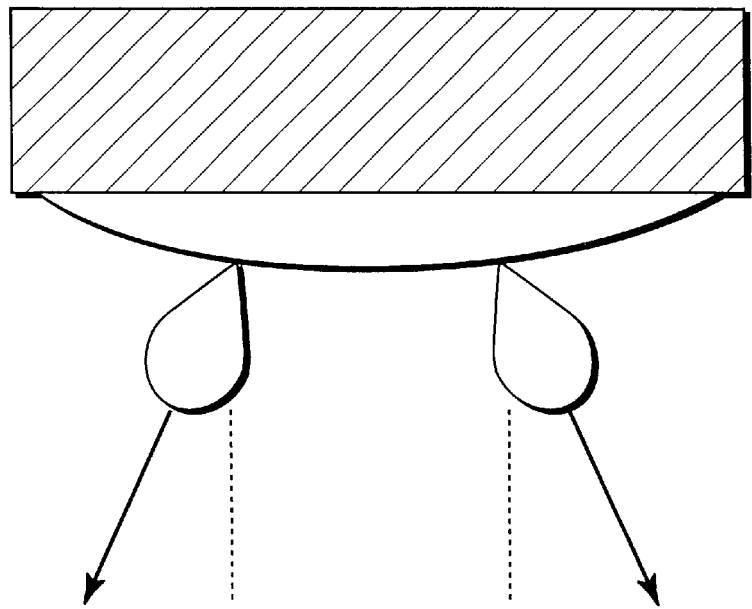

FIGS. 17B to 17D and FIGS. 18A to 18D illustrate the states of an image in the case that in "level 1", the even-numbered rasters have been deviated pixel by pixel from one pixel up to 7 pixels with respect to the odd-numbered raters starting with the state without deviation (FIG. 17A). Moreover, the relation between the covering ratios and the deviation amounts in this case are shown by the continuous line as "patter 2" in FIG. 15. As apparent from this chart, in "pattern 2", variations in the covering ratios fall within about 10%, even if 1- to 2-pixel deviation in dot forming positions occurs between the even- and odd-numbered rasters. Moreover, the covering ratio is about 45% as low as the value taken in "level 1" even when 4-pixel deviation occurs, which makes the covering ratio lowest, however, a density change from the state without deviation (reference state) is approximately a half of "pattern 1" as the original covering ratio with out deviation is as low as 60%. Further, since there are 4 pixels before the covering ratio becomes the minimum, it can be said that a probability in which dots are deviated thereto is rather low compared with the case in "pattern 1".

Moreover, in the case of "pattern 1", not only the variation in the covering ratios is large in amplitude but also the period is short. Therefore, even a slight change in temperature accompanied by the progress of printing operation varies the covering ratio every moment, namely the image density. As opposed to this, in the case of "pattern 2", the covering ratio is almost stable within a deviation range of ±2 pixels, and also the variation cycle of the covering ratio is as long as 8 pixels and the amplitude is small, therefore, the variation in density due to dot deviation is small.

Figure 16A:
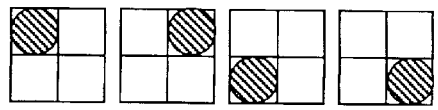
FIGS. 16A to 16C illustrate examples each showing dot arranging patterns of a first and second embodiments in accordance with the present invention defined to different input gradation levels and the state of dot formation by the head shown in FIG. 11 comparing them with each other.
Figure 16B:
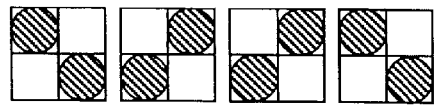

Moreover, in any arranging pattern of FIGS. 12A to 12C, 13A to 13C, and 16A to 16C, the whole image is almost buried with the gradations of "level 2" shown in FIGS. 12B, 13B, and 16B or higher, therefore, there is little difference in the covering ratio among them. Namely, it can be considered that it is only in the case of "level 1" in this embodiment that a change in the covering ratio appears due to deviation in dot forming positions and exerts a harmful influence on the image.

Figure 16C:
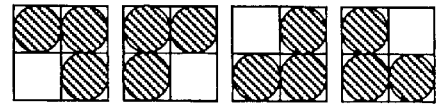

From the above, it can be said that the dot arranging patterns in the case of "pattern 2" as shown in FIGS. 16A to 16C are effective as measures to density variation resulted from the deviation in dot forming positions between the even- and odd-numbered rasters.

In the printing apparatus in this embodiment, it is effective to enable a user to start registration processing (hereafter called user registration) to the deviation in dot forming positions between the even- and odd-numbered rasters and to enable the user to set an adjusting value for the user registration as necessary. This can be carried out, for example, as follows.

Figure 23A:
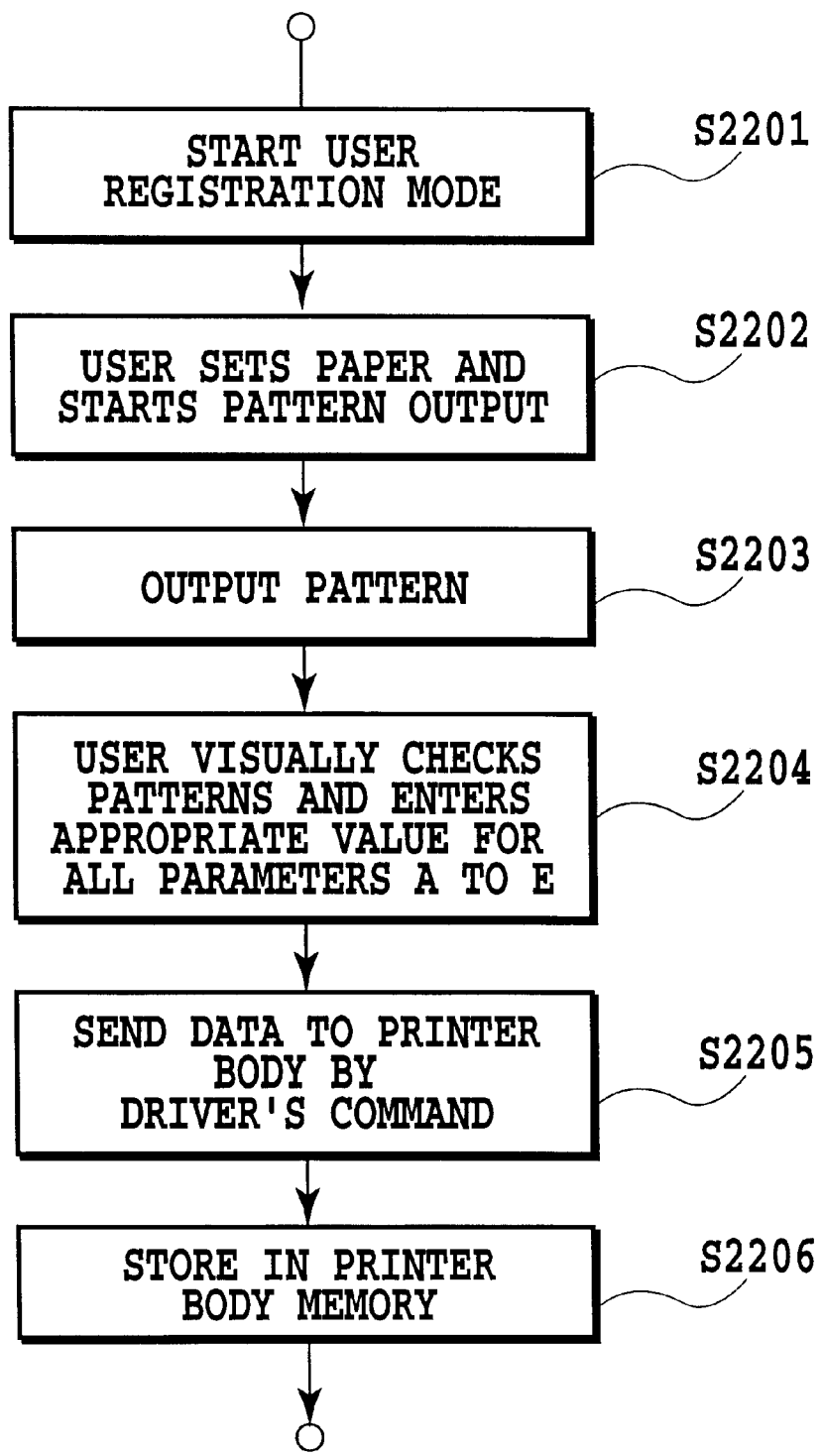
FIG. 23A is a flow chart showing an example sequence of steps for a user registration
Figure 23B:
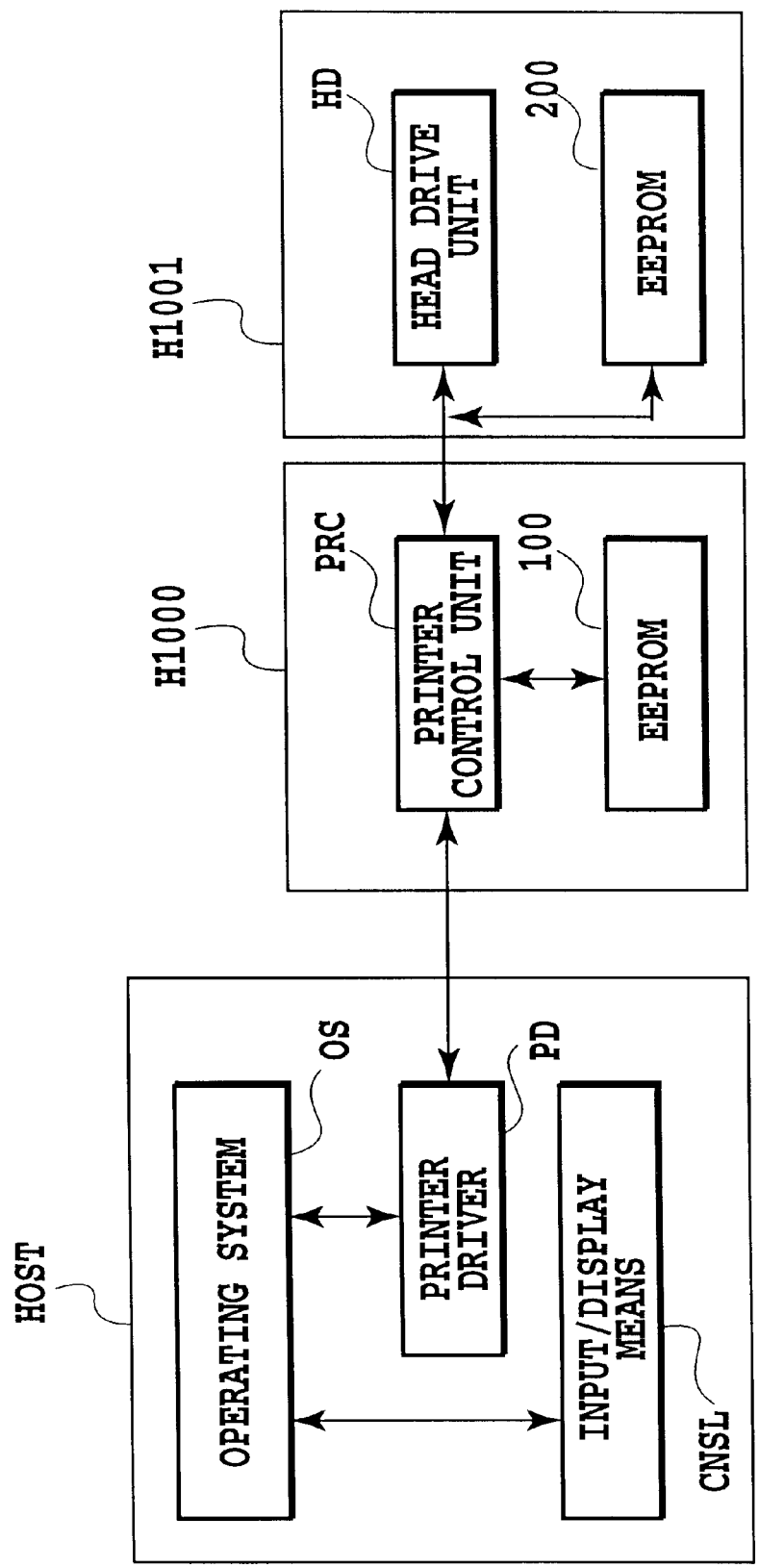
FIG. 23B is a schematic diagram showing a system comprising a host device and a printing apparatus to illustrate mainly a flow of data in the process of FIG. 16A.

FIG. 23A shows a sequence of steps performed by the user registration. FIG. 23B schematically illustrates a system comprising a host device and a printing apparatus to show the data flow during the user registration.

Using a printer driver PD, or a utility program, operating on a predetermined operating system OS of a host device HOST, which may be a personal computer, the user selects a registration mode with an input/display means CNSL including key, pointing device and display (step S2201). Then, the user sets a sheet of paper in the printer body M1000 and starts the printer (step S2202). The printer control unit PRC sends predetermined data to a drive unit HD of the head H1001, which then forms a pattern (FIG. 24) for registration (step S2203). Checking the printed pattern, the user enters an appropriate value into a predetermined area on the printer setting screen of the host device HOST (step S2004). The host device HOST, triggered by a command from the printer driver PD, transfers the registration data to the printer control unit PRC (step S2205). The transferred registration data is stored in the EEPROM 100 in the printer body (step S2206).

Figure 24:
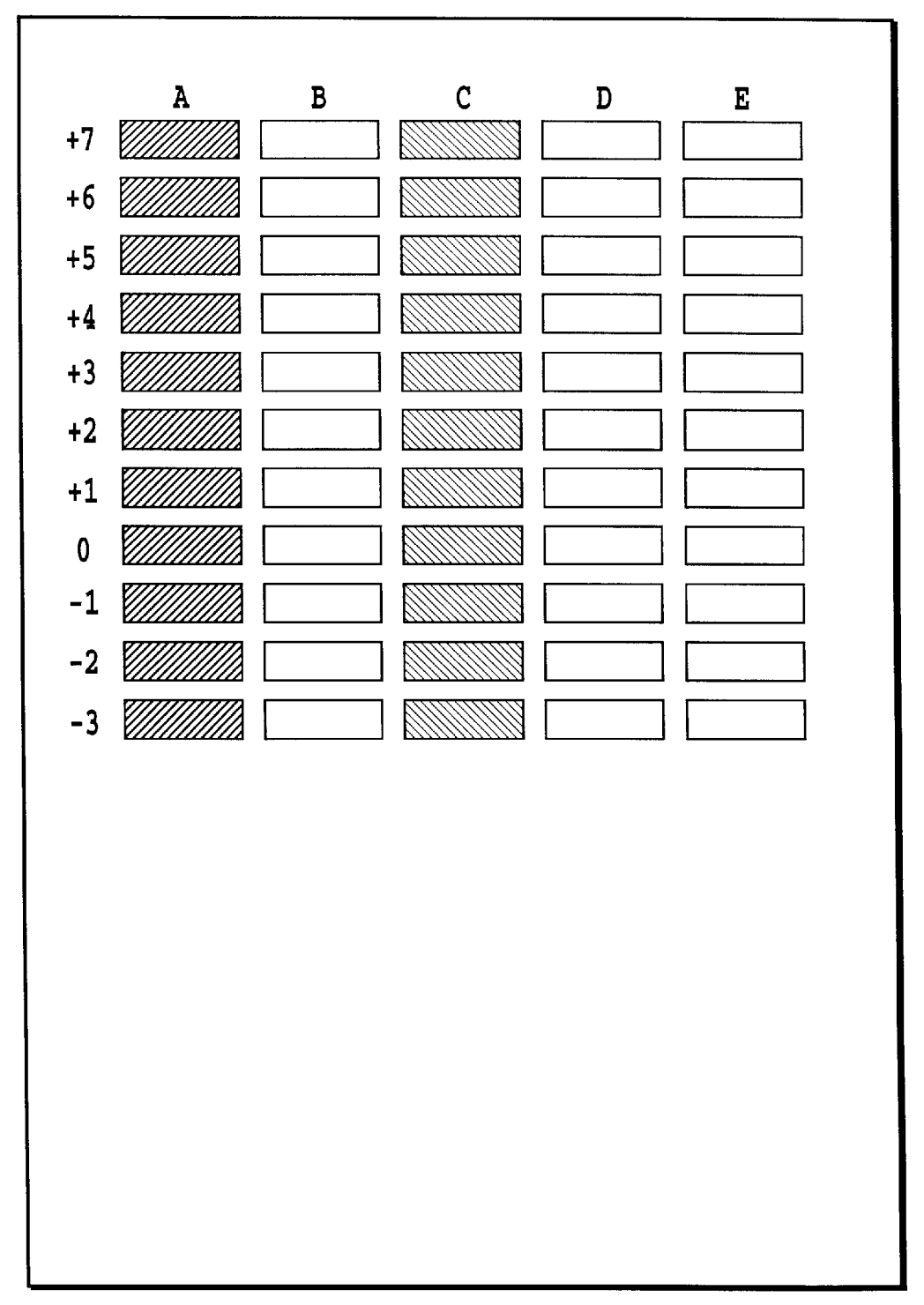

FIG. 24 shows patterns output by the user registration. In the figure, columns A to E are patterns for the for the registration between the even- and odd numbered nozzle columns (O/E registration) of colors of the head H1001, with the column A corresponding to black, column B to cyan, column C to magenta, column D to light cyan and column E to light magenta. Yellow is omitted from the user registration patterns because the visual check on a yellow pattern is difficult to make and because the dot position deviations of yellow do not pose so serious a problem as other colors. As described in FIG. 11, the nozzles for yellow are formed in the same chip in which nozzles for magenta are formed and therefore the drive condition for yellow nozzles is similar to that for the magenta nozzles. In this embodiment, therefore, at step S2205 in FIG. 23A the same values as the registration data for magenta are transferred to the printer body. Hence, the data stored in the EEPROM 100 at step S2206 covers six colors.

The numbers "+7" to "−3" on the left side of FIG. 17 represent the adjustment values for registration and the patterns with these adjustment values are the same. The patterns with these adjustment values, however, are printed by differentiating the relative ejection timings between the even-numbered nozzle column and the odd-numbered nozzle column. In the printer of this embodiment, the minimum unit for adjustment is one pixel and the ejection timing is changed in increments of one pixel. If the adjustment value for the O/E registration is stored in the EEPROM 200 (FIG. 23B) at time of shipment, the patterns at the "0" position (default value) are printed with the adjustment value that was set at time of shipment from factory.

As for other adjustment values "+7" to "+1" and "−1" to "−3", the ejection timing of the odd-numbered nozzle columns is changed from the default value to +7 pixels and to −3 pixels in increments of one pixel, with the ejection timing of the even-numbered nozzle columns fixed. The +direction is for increasing the ejection timing time difference between the even-numbered nozzle column and the odd-numbered nozzle column. As already mentioned, as the face of the head between the even-numbered nozzle column and the odd-numbered nozzle column is bulged by ink swelling or temperature rise, the two columns tend to widen with elapse of time. Thus, the adjustment range in the plus direction is set large, up to 7 pixels (about 147 μm), and the minus direction is set up to −3 pixels (63 μm). The user can choose the most smooth pattern from among the range "+7" to "−3".

It is possible to cope with variation in dot forming position with elapse of time due to durability of the head by such a means.

However, it is difficult to cope in real time with the deviation of dots varied by a rise in temperature during printing by the above-mentioned user registration. The most principal object of this embodiment is to suppress deterioration in image quality caused by about 1- or 2-pixel deviation in dot forming positions resulting from a temporary temperature rise etc. during printing by applying the above-described dot arrangement.

As described above, double measures are adopted in this embodiment to prevent the image quality from deterioration resulting from the deviation in dot forming positions between the even- and odd-numbered rasters.

Moreover, in the case of "pattern 2", variation in a covering ratio when deviation appears is suppressed by properly overlapping adjoining pixels from the dot arrangement in the reference state. In this case, it is possible to make the cycle longer and reduce the amplitude by providing pattern arrangements of the "level 1" in FIG. 12 with a longer cycle and randomness. However, when the cycle becomes long enough to reach a visually confirmable level, there is a fear of being confirmed as a texture. Therefore, the cycle should be set to a high or low frequency which is not perceivable by a visual characteristic of a human being, and the "pattern 2" is correspond to the former. To set the cycle to a low frequency side, it is achievable by using a random arrangement construction by providing it with a sufficient capacity of memory.

In this embodiment, "pattern 2" is considered as sufficient for the purpose of surely correcting the 1- to 2-pixel deviation area. In the case of "pattern 2" as shown in FIG. 15, the covering ratio has a cycle of 8 pixels, therefore, when dot deviation occurs, this cycle is perceived as vertical stripes. However, it can be judged as insignificant since this width is about 168 $\mu$m.

As explained above, according to this embodiment, it is possible to put the differences in the covering ratio of printed dots to 10% or less and prevent image quality deterioration resulting from changes in density due to deviation in dot positions even when the dot positions formed by the even- and odd-numbered rasters are deviated from each other by one to two pixels, by printing with a print resolution of 1200 DPI according to the plural pattern arrangements shown in FIG. 13 to the 5-valued input resolution of 600 DPI.

Moreover, in practical printing operation, it can be performed by software of the CPU E1001 and also proper hardware, for example, a part of the circuit of the ASIC E1008 to allocate input image data quantized into multivalued levels N×M (2×2 in this embodiment) dot arrangement as pseudo half-tone processing, to use the mutually different plural dot arrangements concerning the same level of the input image data at the time of the allocation, and to periodically varying the plural dot arrangements in the main scanning direction according to predetermined rule and also equalize the number of dots in adjoining N rasters in the one cycle.

Namely, in order to let the covering ratio vary like in the case of "pattern 2", for example, it is possible to store in the development data buffer E2018 beforehand the mutually different plural dot arrangement data (dot arranging patterns as shown in FIG. 16) which have been defined for each level of the input data, let the print data development DMA controller E2015 manage the use of these data according to the input data, periodically vary the plural dot arrangements in the main scanning direction according to the predetermined rule, and carry out printing of print data expanded in the print buffer E2014 while equalizing the number of dots in the adjoining N rasters in the one cycle. This is the similar with the embodiment described below.

8. Another Embodiment

Next, the second embodiment of the present invention will be explained. This embodiment relates to a registration mechanism in the case of performing bi-directional printing by the interlaced printing described in the conventional example.

Figure 21:
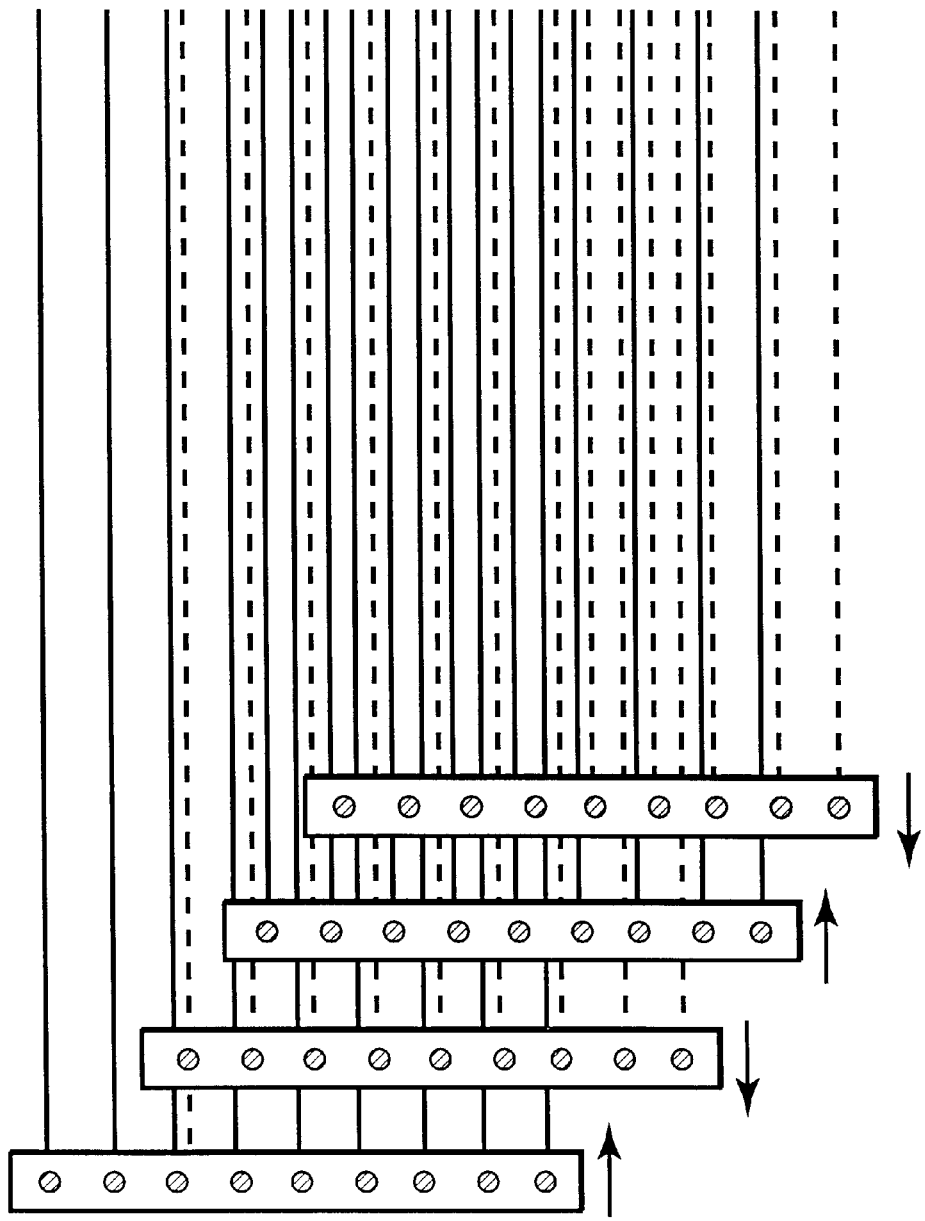
FIG. 21 is a schematic diagram for explaining an interlace printing method adopted in a still another embodiment of the present invention.

As explained referring to FIG. 21 as an example, a harmful influence similar to the dot deviation of between the even- and odd-numbered nozzle columns in the first embodiment is exerted on interlaced bi-directional printing if deviation occurs in dot forming between forward and backward scanning.

Each color nozzle of the print head to be used in this embodiment is arrayed in a line at 600 DPI pitches, and it is assumed that an image of 1200 DPI can be realized by the printing method shown in FIG. 21. Similarly to the first embodiment, a practical input resolution is 600 DPI at the maximum, and one input data is printed in 2×2- four pixels. From this embodiment also, the same effect as that from the first embodiment can be obtained by using the dot arrays shown in FIG. 16.

The printing apparatus in this embodiment is provided with a user registration means similar to the one in the above-mentioned first embodiment against deviation in dot forming positions in bi-directional printing, and a user can thereby adjust the deviation as necessary. Variation with elapse of time in the dot forming position of forward and backward printing resulting from durability of the print head can be coped with by such a means.

However, it is difficult to cope with the dot deviation of forward and backward printing in real time varied due to a rise in temperature during printing by the above-mentioned user registration. The most principal purpose of this embodiment is to prevent image quality deterioration resulting from one to two pixel deviation in dot forming positions between the forward and backward printing caused by a temporary temperature rise etc. during printing by applying the dot arrangements explained above. Thus, in this embodiment also, the image quality deterioration resulting from deviation in dot forming positions between the forward and backward printing is prevented by the double measures.

Figure 22:
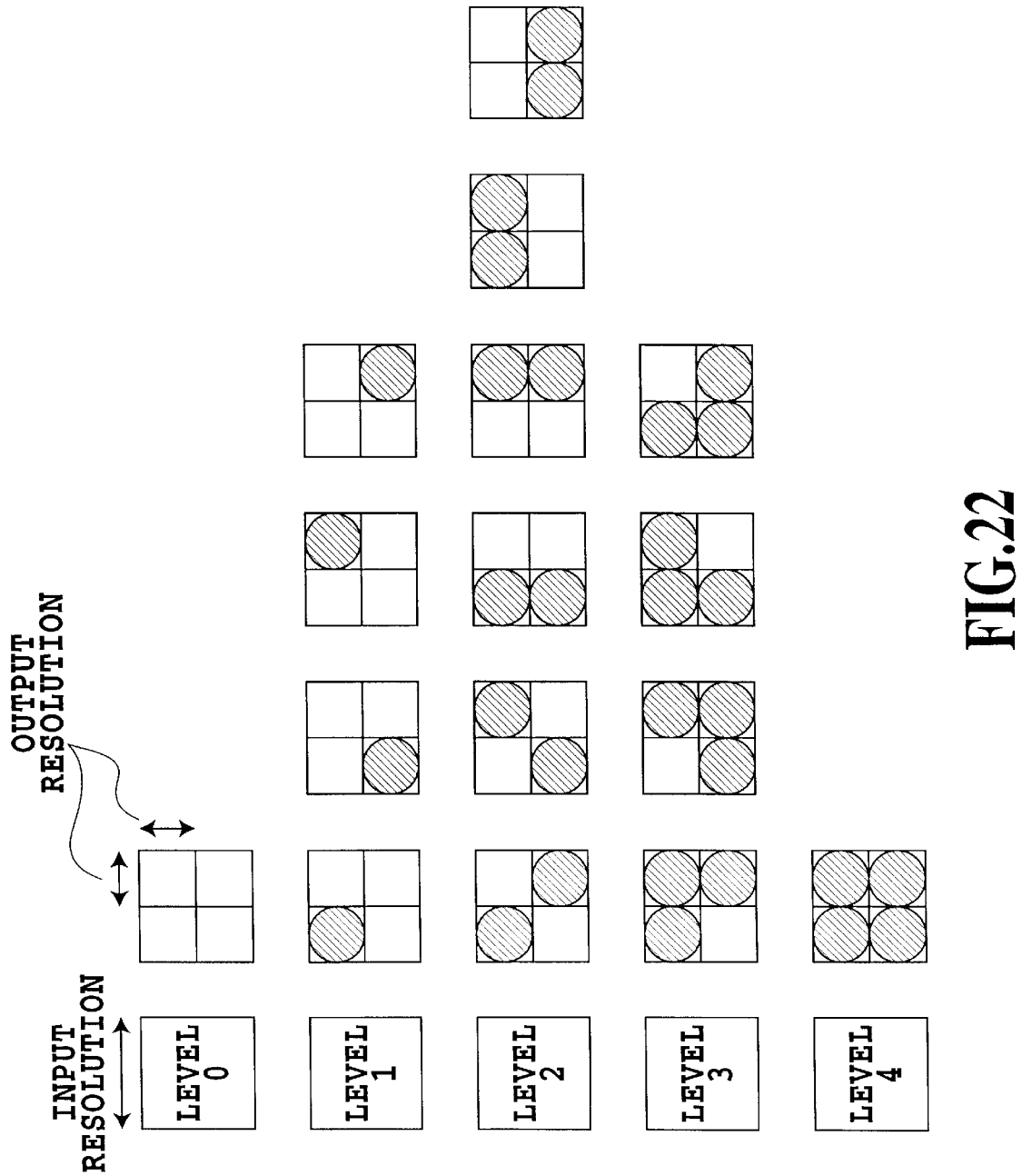
FIG. 22 illustrates dot arranging patterns in 2×2 pixels for a pseudo half-tone expression.

In this embodiment also, it is possible to reduce a change in density by providing the pattern arrangements shown in FIG. 22 with randomness. However, when a random pattern cycle becomes long enough to reach a visually confirmable level, then, there is a fear of being confirmed as a texture. Therefore, the cycle should be set to a high or low frequency which is not perceivable by a visual characteristic of a human being, and the "pattern 2" is correspond to the former. To set the cycle to a low frequency side, it is achievable by using a random arrangement construction by providing it with a sufficient capacity of memory.

In this embodiment, "pattern 2" is considered as sufficient for the purpose of surely correcting the 1- to 2-pixel deviation area. In the case of "pattern 2" as shown in FIG. 15, the covering ratio has a cycle of 8 pixels, therefore, when dot deviation occurs, this cycle is perceived as vertical stripes. However, it can be judged as insignificant since this width is about 168 $\mu$m.

As explained above, in the printing apparatus for carrying out the interlaced printing method in bi-directional printing in accordance with this embodiment, it has become possible to put the differences in the covering ratio of printed dots to 10% or less and suppress image quality deterioration resulting from changes in density due to deviation in dot positions even when the bi-directionally printed dot positions are deviated from each other by one to two pixels, by printing with a print resolution of 1200 DPI according to the plural pattern arrangements shown in FIG. 13 to the 5-valued input resolution of 600 DPI.

9. Further Descriptions

Incidentally, one form of the head to which the present invention can be effectively applied is the one that utilizes thermal energy produced by an electrothermal transducer to cause film boiling in liquid thereby generating bubbles.

Moreover, the scope of the present invention also includes a print system in which program codes of software or printer driver that realize the function of the above embodiment are supplied to the computer in a machine or system to which various devices including the printing apparatus are connected, and in which the program code stored in the computer in the machine or system are executed to operate a variety of devices, thereby realizing the function of the above-described embodiment.

In this case, the program codes themselves realize a novel function of the present invention and therefore the program codes themselves and means to supply the program code to the computer, such as storage media, are also included in the scope of this invention.

The storage media to supply the program codes include, for example, floppy disks, hard disks, optical disks, optical disks, CD-ROMs, CD-Rs, magnetic tapes, nonvolatile memory cards and ROMs.

The scope of this invention includes not only a case where the function of the above-described embodiment is realized by executing the program codes read by the computer but also a case where an operating system running on the computer performs, according to directions of the program codes, a part or all of the actual processing and thereby realizes the function of this embodiment.

Further, the scope of this invention includes a case where the program codes read from a storage medium are written into a memory in a function expansion board inserted in the computer or into a memory in a function expansion unit connected to the computer, after which, based on directions of the program codes, a CPU in the function expansion board or function expansion unit executes a part or all of the actual processing and thereby realizes the function of this embodiment.

As explained above, according to the present invention, it has become possible to suppress deterioration of image quality occurring in the case of deviation in dot forming positions between each raster, while using a head comprising plural ejection openings arranged in the main scanning direction and permitting high resolution printing, or while bi-directionally executing an interlace printing method.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A printing method using a print head on which a plurality of print elements are arranged, said method comprising the steps of:

forming an image on a printing medium by scanning the print head in a direction different from said arranging direction of the plurality of print elements and forming adjoining N rasters of the image in the arranging direction under different conditions; and allocating input image data quantized into multi-valued levels to dot arrangements before the image formation, said allocating step further comprising the steps of:

applying a plurality of the dot arrangements mutually different from each other to a same level of the input image data;

cyclically changing the dot arrangement used in the scan direction according to predetermined rules, and equalizing a number of dots of the adjoining N rasters in a cycle.

2. A printing method as claimed in claim 1, wherein, in said equalization step, differences in a covering ratio of the printing medium with formed dots are within 10% or less in a range where the adjoining N rasters are deviated from each other by at least ±2 pixels in the scan direction.

3. A printing method as claimed in claim 1, wherein the print head has N columns of print elements arranged side by side in the scan direction, the N columns of print elements are shifted from each other by an amount less than a pitch at which the print elements are arranged in the column, and the N columns of print elements print the N rasters.

4. A printing method as claimed in claim 1, wherein said method is applied to an apparatus, in which the print head is operated to scan the printing medium in forward and backward directions, and the image formation is carried out by relatively transporting the printing medium in a direction perpendicular to the scan directions by quantities for printing at a density higher than an arranging density of the plurality of print elements between the forward and backward scanning, and the printing of the N(=2) rasters is carried out by the scanning in the forward and backward directions.

5. A printing method as claimed in claim 1, further comprising a step of carrying out an adjustment of drive timings to the plurality of print elements in the N rasters.

6. A printing method as claimed in claim 1, wherein the print head is one which carries out printing by ejecting ink, and the print elements have ejection openings for ejecting the ink.

7. A printing method as claimed in claim 6, wherein said print head has heating elements to generate thermal energy for causing film boiling in the ink as an energy for ejecting the ink from the ejection openings.

8. A printing apparatus using a print head on which a plurality of print elements are arranged, said apparatus comprising:

a unit for forming an image on a printing medium by scanning said print head in a direction different from said arranging direction of the plurality of print elements and forming adjoining N rasters of the image in said arranging direction under different conditions; and a unit for allocating input image data quantized into multi-valued levels to dot arrangements before said image formation, said allocating unit applying a plurality of said dot arrangements mutually different from each other to a same level of said input image data, cyclically changing said dot arrangement used in said scan direction according to predetermined rules, and equalizing a number of dots of said adjoining N rasters in a one cycle.

9. A printing apparatus as claimed in claim 8, wherein said allocating unit, in said equalization processing, puts differences in a covering ratio of said printing medium with formed dots within 10% or less in a range where said adjoining N rasters are deviated from each other by at least ±2 pixels in said scan direction.

10. A printing apparatus as claimed in claim 8, wherein said print head has N columns of print elements arranged side by side in said scan direction, said N columns of print elements are shifted from each other by an amount less than a pitch at which said print elements are arranged in the column, and said N columns of print elements print said N rasters.

11. A printing apparatus as claimed in claim 8, wherein said print head is operated to scan said printing medium in forward and backward directions, and said image formation is carried out by relatively transporting said printing medium in a direction perpendicular to said scan directions by quantities for printing at a density higher than an arranging density of said plurality of print elements between said forward and backward scanning, and the printing of said N(=2) rasters is carried out by the scanning in said forward and backward directions.

12. A printing apparatus as claimed in claim 8, further comprising means for carrying out an adjustment of drive timings to said plurality of print elements in said N rasters.

13. A printing apparatus as claimed in claim 8, wherein said print head is the one which carries out printing by ejecting ink, and said print elements have ejection openings for ejecting said ink.

14. A printing apparatus as claimed in claim 13, wherein said print head has heating elements to generate thermal energy for causing film boiling in said ink as an energy for ejecting said ink from said ejection openings.

15. A control method of a printing apparatus for printing by using a print head on which a plurality of print elements are arranged, said method comprising the steps of:
  controlling the print head to form adjoining N rasters of an image in the arranging direction of the plurality of print elements under different conditions when the image on a printing medium is formed by scanning the print head in a direction different from the arranging direction; and
  allocating input image data quantized into multi-valued levels to dot arrangements before the image formation, said allocating step further comprising the steps of:
    applying a plurality of the dot arrangements mutually different from each other to a same level of the input image data;
    cyclically changing the dot arrangement used in the scan direction according to predetermined rules, and equalizing a number of dots of the adjoining N rasters in a one cycle.

16. A program for performing a control method of a printing by means of a computer, said apparatus for printing by using a print head on which a plurality of print elements are arranged, said method comprising the steps of:
  controlling the print head to form adjoining N rasters of an image in the arranging direction of the plurality of print elements under different conditions when the image on a printing medium is formed by scanning the print head in a direction different from the arranging direction; and
  allocating input image data quantized into multi-valued levels to dot arrangements before the image formation, said allocating step further comprising the steps of:
    applying a plurality of the dot arrangements mutually different from each other to a same level of the input image data;
    cyclically changing the dot arrangement used in the scan direction according to predetermined rules, and equalizing a number of dots of the adjoining N rasters in a one cycle.

17. A printing method according to claim 1,
  wherein the dot arrangement is a pattern in which the dots are arranged within a matrix expanding in both the raster direction corresponding to the scan direction and the column direction corresponding to the arranging direction of the print elements,
  wherein a plurality of the dot arrangements to be used are patterns in which the dots are arranged in the odd-numbered columns and in which the dots are arranged in even-numbered columns,
  wherein the cyclically changing step varies the dot arrangement to be used by alternate uses of the pattern in which the dots are arranged in the odd-numbered columns and the pattern in which the dots are arranged in the even-numbered columns repeatedly in this order.

18. A printing method according to claim 17,
  wherein the plurality of dot arrangements to be used comprise a first pattern in which the dots are arranged in odd-numbered columns and odd-numbered rasters, a second pattern in which the dots are arranged in even-numbered columns and odd-numbered rasters, a third pattern in which the dots are arranged in odd-numbered columns and even-numbered rasters and a fourth pattern in which the dots are arranged in even-numbered columns and even-numbered rasters,
  wherein the cyclically changing step varies the dot arrangements to be used by alternate uses of the first pattern, the second pattern, the third pattern, and the fourth pattern repeatedly in this order.

19. A printing method according to claim 17,
  wherein the dot arrangements are patterns in each of which the dots are arranged within an N×N matrix having an N dot size in the raster direction and in the column direction,
  wherein the plurality of dot arrangements to be used comprise a first pattern in which the dots are arranged in odd-numbered columns and odd-numbered rasters, a second pattern in which the dots are arranged in even-numbered columns and odd-numbered rasters, a third pattern in which the dots are arranged in odd-numbered columns and even-numbered rasters, and a fourth pattern in which the dots are arranged in even-numbered columns and even-numbered rasters,
  wherein the cyclically changing step varies the dot arrangements to be used by alternate uses of the first pattern, the second pattern, the third pattern, and the fourth pattern repeatedly in this order.

20. A printing apparatus according to claim 8,
  wherein said dot arrangement is a pattern in which said dots are arranged within a matrix expanding in both the raster direction corresponding to the scan direction and the column direction corresponding to the arranging direction of said print elements,
  wherein a plurality of said dot arrangements to be used are patterns in which said dots are arranged in the odd-numbered columns and in which said dots are arranged in even-numbered columns,
  wherein the cyclical changing of said dot arrangement varies said dot arrangement to be used by alternate uses of said pattern in which said dots are arranged in the odd-numbered columns and said pattern in which said dots are arranged in the even-numbered columns repeatedly in this order.

21. A printing apparatus according to claim 20,
  wherein said plurality of dot arrangements to be used comprise a first pattern in which said dots are arranged in odd-numbered columns and odd-numbered rasters, a second pattern in which said dots are arranged in even-numbered columns and odd-numbered rasters, a third pattern in which said dots are arranged in odd-numbered columns and even-numbered rasters, and a fourth pattern in which said dots are arranged in even-numbered columns and even-numbered rasters, wherein the cyclical changing of said dot arrangement varies said dot arrangement to be used by alternate uses of said first pattern, said second pattern, said third pattern, and said fourth pattern repeatedly in this order.

22. A printing apparatus according to claim 20, wherein said dot arrangements are patterns in each of which said dots are arranged within an N×N matrix having an N dot size in the raster direction and in the column direction, wherein said plurality of dot arrangements to be used comprise a first pattern in which said dots are arranged in odd-numbered columns and odd-numbered rasters, a second pattern in which said dots are arranged in even-numbered columns and odd-numbered rasters, a third pattern in which said dots are arranged in odd-numbered columns and even-numbered rasters, and a fourth pattern in which said dots are arranged in even-numbered columns and even-numbered rasters, wherein the cyclical changing of said dot arrangement varies said dot arrangement to be used by alternate uses of said first pattern, said second pattern, said third pattern, and said fourth pattern repeatedly in this order.

23. A control method according to claim 15, wherein the dot arrangement is a pattern in which the dots are arranged within a matrix expanding in both the raster direction corresponding to the scan direction and the column direction corresponding to the arranging direction of the print elements, wherein a plurality of the dot arrangements to be used are patterns in which the dots are arranged in the odd-numbered columns and in which the dots are arranged in even-numbered columns, wherein the cyclically changing step varies the dot arrangement to be used by alternate uses of the pattern in which the dots are arranged in the odd-numbered columns and the pattern in which the dots are arranged in the even-numbered columns repeatedly in this order.

24. A control method according to claim 23, wherein the plurality of dot arrangements to be used comprise a first pattern in which the dots are arranged in odd-numbered columns and odd-numbered rasters, a second pattern in which the dots are arranged in even-numbered columns and odd-numbered rasters, a third pattern in which the dots are arranged in odd-numbered columns and even-numbered rasters and a fourth pattern in which the dots are arranged in even-numbered columns and even-numbered rasters, wherein the cyclically changing step varies the dot arrangements to be used by alternate uses of the first pattern, the second pattern, the third pattern, and the fourth pattern repeatedly in this order.

25. A control method according to claim 23, wherein the dot arrangements are patterns in each of which the dots are arranged within an N×N matrix having an N dot size in the raster direction and in the column direction, wherein the plurality of dot arrangements to be used comprise a first pattern in which the dots are arranged in odd-numbered columns and odd-numbered rasters, a second pattern in which the dots are arranged in even-numbered columns and odd-numbered rasters, a third pattern in which the dots are arranged in odd-numbered columns and even-numbered rasters, and a fourth pattern in which the dots are arranged in even-numbered columns and even-numbered rasters, wherein the cyclically changing step varies the dot arrangements to be used by alternate uses of the first pattern, the second pattern, the third pattern, and the fourth pattern repeatedly in this order.

26. A program according to claim 16, wherein the dot arrangement is a pattern in which the dots are arranged within a matrix expanding in both the raster direction corresponding to the scan direction and the column direction corresponding to the arranging direction of the print elements, wherein a plurality of the dot arrangements to be used are patterns in which the dots are arranged in the odd-numbered columns and in which the dots are arranged in even-numbered columns, wherein the cyclically changing step varies the dot arrangement to be used by alternate uses of the pattern in which the dots are arranged in the odd-numbered columns and the pattern in which the dots are arranged in the even-numbered columns repeatedly in this order.

27. A program according to claim 26, wherein the plurality of dot arrangements to be used comprise a first pattern in which the dots are arranged in odd-numbered columns and odd-numbered rasters, a second pattern in which the dots are arranged in even-numbered columns and odd-numbered rasters, a third pattern in which the dots are arranged in odd-numbered columns and even-numbered rasters and a fourth pattern in which the dots are arranged in even-numbered columns and even-numbered rasters, wherein the cyclically changing step varies the dot arrangments to be used by alternate uses of the first pattern, the second pattern, the third pattern, and the fourth pattern repeatedly in this order.

28. A program according to claim 26, wherein the dot arrangements are patterns in each of which the dots are arranged within an N×N matrix having a N dot size in the raster direction and in the column direction, wherein the plurality of dot arrangements to be used comprise a first pattern in which the dots are arranged in odd-numbered columns and odd-numbered rasters, a second pattern in which the dots are arranged in even-numbered columns and odd-numbered rasters, a third pattern in which the dots are arranged in odd-numbered columns and even-numbered rasters, and a fourth pattern in which the dots are arranged in even-numbered columns and even-numbered rasters, wherein the cyclically changing step varies the dot arrangements to be used by alternate uses of the first pattern, the second pattern, the third pattern, and the fourth pattern repeatedly in this order.

* * * * *

UNITED STATES PATENT AND TRADEMARK OFFICE
CERTIFICATE OF CORRECTION

PATENT NO. : 6,491,373 B1
DATED : December 10, 2002
INVENTOR(S) : Miyuki Fujita et al.

It is certified that error appears in the above-identified patent and that said Letters Patent is hereby corrected as shown below:

<u>Title page,</u>
Item [56], References Cited, FOREIGN PATENT DOCUMENTS,
"7242025" should read -- 7-242024 --;
"9046522" should read -- 9-46522 --.

<u>Column 1,</u>
Line 29, "has" should read -- have --.

<u>Column 2,</u>
Line 66, "plurality" should read -- plurality of --.

<u>Column 3,</u>
Line 1, "base," should read -- case, --.

<u>Column 7,</u>
Line 61, "lo" should be deleted.

<u>Column 8,</u>
Line 30, "registration" should read -- registration; --.

<u>Column 12,</u>
Line 30, "hat" should read -- that --.

<u>Column 18,</u>
Line 29, "shorten." should read -- shortened. --.

<u>Column 19,</u>
Line 16, "raters" should read -- rasters --;
Line 20, ""patter 2"" should read -- "pattern 2" --;
Line 29, "with out" should read -- without --.

UNITED STATES PATENT AND TRADEMARK OFFICE
CERTIFICATE OF CORRECTION

PATENT NO. : 6,491,373 B1
DATED : December 10, 2002
INVENTOR(S) : Miyuki Fujita et al.

It is certified that error appears in the above-identified patent and that said Letters Patent is hereby corrected as shown below:

<u>Column 24,</u>
Line 7, "a" should read -- a one --;
Line 47, "said" should read -- the --.

<u>Column 28,</u>
Line 47, "a" should read -- an --.

Signed and Sealed this

Fourth Day of November, 2003

JAMES E. ROGAN
*Director of the United States Patent and Trademark Office*